US008879504B2

(12) United States Patent
Ng et al.

(10) Patent No.: US 8,879,504 B2
(45) Date of Patent: Nov. 4, 2014

(54) REDIRECTION METHOD, REDIRECTION SYSTEM, MOBILE NODE, HOME AGENT, AND PROXY NODE

(75) Inventors: Chan Wah Ng, Singapore (SG); Keigo Aso, Kanagawa (JP); Chun Keong Benjamin Lim, Singapore (SG); Mohana Dhamayanthi Jeyatharan, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 312 days.

(21) Appl. No.: 13/381,167

(22) PCT Filed: May 28, 2010

(86) PCT No.: PCT/JP2010/003604
§ 371 (c)(1),
(2), (4) Date: Dec. 28, 2011

(87) PCT Pub. No.: WO2011/001594
PCT Pub. Date: Jan. 6, 2011

(65) Prior Publication Data
US 2012/0106554 A1    May 3, 2012

(30) Foreign Application Priority Data
Jun. 29, 2009 (JP) ................. 2009-153914

(51) Int. Cl.
| H04W 4/00 | (2009.01) |
| H04L 12/28 | (2006.01) |
| H04L 12/56 | (2006.01) |
| H04W 76/04 | (2009.01) |
| H04L 12/46 | (2006.01) |
| H04W 36/00 | (2009.01) |
| H04W 80/04 | (2009.01) |

(52) U.S. Cl.
CPC .......... *H04W 76/041* (2013.01); *H04L 12/4633* (2013.01); *H04W 36/0005* (2013.01); *H04W 36/0011* (2013.01); *H04W 80/04* (2013.01)
USPC ............................ 370/331; 370/332; 370/392

(58) Field of Classification Search
USPC .......................................... 370/331, 332, 392
See application file for complete search history.

(56) References Cited

U.S. PATENT DOCUMENTS 7,366,182 B2 * 4/2008 O'Neill ..................... 370/395.53
7,385,957 B2 * 6/2008 O'Neill ......................... 370/338

(Continued)

FOREIGN PATENT DOCUMENTS

| EP | 1 990 951 A1 | 11/2008 |
| JP | 2005-253024 A | 9/2005 |

(Continued)

OTHER PUBLICATIONS

Johnson, D. B., Perkins, C. E., and Arkko, J., "Mobility Support in IPv6", Internet Engineering Task Force Request for Comments 3775, pp. 1-166, Jun. 2004.

(Continued)

*Primary Examiner* — Farah Faroul
(74) *Attorney, Agent, or Firm* — Pearne & Gordon LLP

(57) ABSTRACT

Disclosed is a technique to eliminate wasted tunneling encapsulation processing during redirection of a packet. According to the technique, when a packet of a first connection passing through a local mobility anchor ("LMA") 111 and a mobile access gateway ("MAG") 121 using a first prefix of an interface 131 of a mobile node ("MN") 130 is redirected to a second connection passing through a LMA 112 and a MAG 122 using a second prefix of an interface 132 of the MN 130, a redirection tunnel T1 is established between the LMA 111 and the LMA 112. When the MAG 122 knows the first prefix, the LMA 112 encapsulates a packet addressed to the first prefix that is redirected via the tunnel T to be addressed to the MAG 122 for transferring.

6 Claims, 15 Drawing Sheets

(56) References Cited

U.S. PATENT DOCUMENTS

| | | | |
|---|---|---|---|
| 7,505,442 B2* | 3/2009 | Kniveton | 370/338 |
| 8,675,630 B2* | 3/2014 | Cherian et al. | 370/348 |
| 2006/0146781 A1 | 7/2006 | Adrangi et al. | |
| 2007/0250642 A1* | 10/2007 | Thubert et al. | 709/245 |
| 2008/0205345 A1 | 8/2008 | Sachs et al. | |
| 2009/0046767 A1* | 2/2009 | Tinnakornsrisuphap et al. | 375/211 |
| 2009/0313379 A1* | 12/2009 | Rydnell et al. | 709/228 |
| 2010/0315973 A1* | 12/2010 | Hirano et al. | 370/254 |
| 2011/0026435 A1* | 2/2011 | Weniger et al. | 370/254 |

FOREIGN PATENT DOCUMENTS

| | | |
|---|---|---|
| JP | 2005-311702 A | 11/2005 |
| JP | 2009-510871 A | 3/2009 |
| WO | 03/107600 A1 | 12/2003 |
| WO | 2006/010382 A1 | 2/2006 |
| WO | 2006/058206 A2 | 6/2006 |
| WO | 2006/138736 A2 | 12/2006 |
| WO | 2008/071276 A1 | 6/2008 |
| WO | 2008/110902 A2 | 9/2008 |
| WO | 2008/127662 A1 | 10/2008 |
| WO | 2009/000886 A1 | 12/2008 |
| WO | 2009/013099 A1 | 1/2009 |

OTHER PUBLICATIONS

Gundavelli, S., et al., "Proxy Mobile IPv6", Internet Engineering Task Force Draft draft-ietf-netlmm-proxymip6-11.txt, pp. 1-47, Feb. 2008.

Wakikawa, R. et al., "Multiple Care-of Addresses Registration", Internet Engineering Task Force Draft: draft-ietf-monami6-multiplecoa-12.txt, pp. 1-81 Mar. 2009.

Soliman, H., et al., "Flow Bindings in Mobile IPv6 and Nemo Basic Support", Internet Engineering Task Force Draft: draft-ietf-mext-flow-binding-01.txt, pp. 1-32, Feb. 2009.

International Search Report for PCT/JP2010/003604 dated Jul. 6, 2010.

* cited by examiner

REDIRECTION METHOD, REDIRECTION SYSTEM, MOBILE NODE, HOME AGENT, AND PROXY NODE

TECHNICAL FIELD

The present invention relates to a redirection method and a redirection system to redirect a packet.

The present invention further relates to a mobile node, a home agent and a proxy node in the redirection system.

BACKGROUND ART

These days a lot of mobile devices communicate with each other using Internet Protocols (IP). To provide such mobile devices with mobility support, IETF (Internet Engineering Task Force) proposes a client-based mobility management protocol known as mobile IP (Mobility Support in IPv6, hereinafter called MIP) as indicated in the following Non-Patent Document 1 and a network-based mobility management protocol known as a proxy mobile IP (PMIP) as indicated in the following Non-Patent Document 2.

According to the MIP, each mobile node has a permanent home network. When the mobile node attaches to the home network, a primary global address known as a home address (HoA) is assigned to the mobile node. When the mobile node moves outside the home network and attaches to another foreign network, a temporary global address known as a care-of address (CoA) is assigned to the mobile node. According to the concept of the mobility support, even when the mobile node attaches to a foreign network, a packet addressed to the HoA is reachable for the mobile node. This reachability is implemented by providing an entity known as a home agent (HA) in the home network. The mobile node registers its own CoA with the HA using a message known as a binding update (BU) message. This registration allows the HA to create binding between the HoA and the CoA of the mobile node. Then, the HA intercepts a message addressed to the HoA of the mobile node and transfers the packet to the CoA of the mobile node using packet encapsulation. This packet encapsulation sets the packet addressed to the HoA of the mobile node in a new packet payload, and is also known as packet tunneling.

This MIP copes with problems for mobility, but has several problems. One of these problems is that the mobile node itself needs to transmit a BU message to its own HA. This means that a mobile node moving at high speed has to generate a large number of BU messages. A mobile node at a geographically remote place from its own HA may take more time to transmit a BU message to the HA. When the HA starts transferring of a packet addressed to an updated CoA, the mobile node may be no longer located at such a transfer destination. For these reasons, network-based local mobility management is proposed as disclosed in IETF RFC 5213 (Non-Patent Document 2) and the following Patent Document 11 and Patent Document 9. In this method, a mobile node can use the same address continuously even when the mobile node changes a point of attachment in a local network domain, and therefore the frequency to transmit a BU message to the HA of the mobile node can be reduced.

The network-based local mobility management (Net LMM) uses one local mobility anchor (LMA), a plurality of mobile access gateways (MAGs) and one AAA (Authentication Authorization and Accounting) server. The MAG operates as an access router as well for a mobile node attaching the MAG. Every time a mobile node attaches to the MAG, the MAG firstly verifies a credential of the mobile node with the AAA server so as to authorize the mobile node for qualification to use services in the local network domain. The AAA server further informs the MAG of a prefix, i.e., an address to be assigned to the mobile node. This procedure allows the MAG to advertise the same prefix known as a home network prefix (HNP) to the mobile node. At the same time the MAG needs to update the LMA so as to tunnel a packet transmitted to the prefix assigned to the mobile node to a MAG the mobile node currently attaches to. This update is implemented by transmitting, from the MAG to the LMA, a proxy BU (PBU) message binding the address the mobile node uses with the MAG address.

This procedure is known as proxy mobile IP (PMIP) as well, because the MAG as a proxy of the mobile node transmits the PBU message to the LMA, and the LMA operates as a home agent of the mobile node in the local network domain. In this way, irrespective of which MAG the mobile node attaches to currently, the mobile node always refers to the same home network prefix (HNP), and therefore does not change its own address. As a result, there is no need for the mobile node to frequently transmit a BU message to its own home agent.

Meanwhile, various wireless techniques have been rapidly introduced, for instance, increased number of mobile nodes are available equipped with various access interfaces such as UMTS cellular interface, wireless Ethernet® 802.11 interface, WiMAX® (802.16) interface and Bluetooth® interface. In order to support a device provided with a plurality of interfaces in the local mobility management, a plurality of prefixes, i.e., addresses are assigned to the device. According to IETF RFC 5213 in Non-Patent Document 2, a mobile node refers to a different prefix for each of a plurality of interfaces, and this prefix is maintained as long as the mobile node roams in the same network. When the mobile node is a MIP node roaming in a foreign domain, such a mobile node needs to configure a plurality of CoAs (one CoA from each prefix) and bind the plurality of CoAs with its own HoA. This is because, when the mobile node wants to use all interfaces communicated with the home agent (HA) and the correspondent node (CN), the mobile node needs to transmit a plurality of BU messages to the HA and the CN using mechanisms described in the following Non-Patent Document 3 "IETF Draft Multiple CoA" and the following Non-Patent Document 4 "IETF Draft Flow Binding".

Currently, network-based mobility management in a pure sense is not available. Cellular-based systems can use mechanisms such as SIP (Session Initiation Protocol) protocol and a protocol disclosed in the following Patent Document 7. However, in order to redirect a typical IP session over different interfaces, tunneling techniques as disclosed in the following Patent Documents 1, 2, 3 and 5 may have to be used. This is because, during redirecting, an original packet having a prefix assigned to a first interface as a destination is routed to a second prefix as a different prefix. Further, when a prefix as a destination is different, a router on the route may execute Ingress filtering to discard the packet.

The tunneling techniques may require an IP tunnel or a layer-2 bearer terminated at the mobile node, and therefore the processing load and the packet size will increase. As one method to avoid the tunneling techniques, a router along the path may be informed so as to let a packet addressed to a prefix pass even when the prefix is not the one assigned to a target interface. This method, however, cannot be used for the case where the router on the route is a legacy (not knowing a prefix P1 of a first connection), and the router is not easily changed at low cost. As another method, as disclosed in the following Patent Document 8, an anchor point may change a packet address. This method may allow a mobility anchor to change a destination address of a packet to a second address within a range of a prefix assigned to a target interface to which the packet is to be routed. This method can avoid Ingress filtering by the router on the route without the need of any special encapsulation.

PRIOR ART DOCUMENTS

Patent Documents

Patent Document 1: [PCT Patent Application International Publication WO 2009/013099A1] Fiat, L., "A Method for Routing Traffic Across an IP-based Transport Network in a Mobile Network", January 2009.
Patent Document 2: [PCT Patent Application International Publication WO 20091000886A1] Chen, X., "Apparatuses and Method for Communicating a Request for an Internet Protocol Address to the Visited Serving Gateway", December 2008.
Patent Document 3: [EP Patent Application Publication EP 1990951A1] Brand, B. and Liebhart, R., "3GPP Integrated WiMAX CSN Interworking Function", November 2008.
Patent Document 4: [PCT Patent Application International Publication WO 2008/127662A1] Faccin, S., "Packet Data Network Connectivity Domain Selection and Bearer Setup", October 2008.
Patent Document 5: [PCT Patent Application International Publication WO 2008/110902A2] Walker, J., "Method and System for Global Anchor Registration", September 2008.
Patent Document 6: [PCT Patent Application International Publication WO 2008/071276A1] Velev, G. et al., "Local Mobility Anchor Relocation and Route Optimization During Handover of a Mobile Node to another Network Area", June 2008.
Patent Document 7: [PCT Patent Application International Publication WO 2006/138736A2] Kant, N., "Voice Call Continuity Application Server between IP-CAN and CS Networks", December 2006.
Patent Document 8: [US Patent Application Publication US 2006/0146781A1] Adrangi, F., et al., "Access to Cellular Services from an Internet Protocol Network", July 2006.
Patent Document 9: [PCT Patent Application International Publication WO 2006/058206A2] Chari, A. et al., "A method of subnet roaming within a network", June 2006.
Patent Document 10: [PCT Patent Application International Publication WO 2006/010382A1] Dell'uomo, L. et al. "Method and System for Controlling Operation of a Communication Network, Related Network and Computer Program Product therefor", February 2006
Patent Document 11: [PCT Patent Application International Publication WO 03/107600A1] Maenpaa, S. and Vesterinen, S., "A Method and System for Local Mobility Management", December 2003.

Non-Patent Documents

Non-Patent Document 1: Johnson, D. B., Perkins, C. E., and Arkko, J., "Mobility Support in IPv6", Internet Engineering Task Force Request For Comments 3775, June 2004.
Non-Patent Document 2: Gundavelli, S., et al., "Proxy Mobile IPv6", Internet Engineering Task Force Draft draft-ietf-netlmm-proxymip6-11.txt, February 2008.
Non-Patent Document 3: Wakikawa, R. et al., "Multiple Care-of Addresses Registration", Internet Engineering Task Force Draft: draft-ietf-monami6-multiplecoa-12.txt, March 2009.
Non-Patent Document 4: Soliman, H., et al., "Flow Bindings in Mobile IPv6 and Nemo Basic Support", Internet Engineering Task Force Draft: draft-ietf-mext-flow-binding-01.txt, February 2009.

Referring now to FIG. 15, the aforementioned tunneling method is described below. A mobile node (MN) 130 has two interfaces 131 and 132, and roams to a local domain 110 and accesses a global communication network 100 such as the Internet. The local domain 110 as well as LMAs 111 and 112 and MAGs 121, 122 and 124 provide network-based local mobility support to the MN 130. Herein, let that the MN 130 attaches to the MAG 121 via an access network 101 using the interface 131, while attaching to the MAG 122 via an access network 102 using the interface 132. In the first connection via the interface 131, a first prefix P1 is assigned to the MN 130, and in the second connection via the interface 132, a second prefix P2 is assigned to the MN 130.

In assumption (1), the LMA 111 is a local mobility anchor (home agent) for both of the first and the second connections, and the LMA 112 does not relate to the first and the second connections. Let herein that the MN 130 wants to redirect a communication session currently using the address HoA (P1) generated from the first prefix P1 to the second interface 132. Receiving a packet addressed to the HoA (P1), the LMA 111 can tunnel the packet to be addressed to the MAG 122 as a proxy of the second connection. Since the MAG 122 handles the prefix P2 only, when the MAG 122 does not notice the prefix P1 assigned to the MN 130, the MAG 122 may discard the packet because the destination address HoA (P1) does not agree with the prefix P2. This is Ingress filtering. Therefore, in order to route the packet to the interface 132, the LMA 111 can execute one of the following three options.

As a first option, the LMA 111 as a redirect source can additionally inform the second MAG 122 as a redirection destination of the prefix P1 assigned to the MN 130. This method allows the MAG 122 to let a packet with the destination address of HoA (P1) pass through the access network 102. This method, however, cannot be implemented when the MAG 122 is a legacy and so does not understand the additional prefix P1. As a second option, the LMA 111 can encapsulate a packet with the destination address of HoA (P1) in a packet with the destination address of HoA (P2) configured from the prefix P2. This method is known as packet tunneling. Although this method can operate even when the MAG 122 is a legacy and so does not understand the additional prefix P1, the method causes the load of additional decapsulation processing of the MN 130 and increases a packet size. As a third option, the LMA 111 can change the destination address HoA (P1) of the packet to a special destination address HoA (P2) configured from the prefix P2. Receiving this packet, the MN 130 understands the special destination address HoA (P2) and returns it to the original destination address HoA (P1).

In assumption (2), a plurality of anchor points exist as home agents (LMA 111, 112) of the MN 130 on a communication network, and each of the different prefixes P1 and P2 assigned to the MN 130 is handled by a different LMA 111 or 112. When the plurality of LMAs 111, 112 (i.e., home agents) exist as in the assumption (2), the methods of making the LMA 111 as the redirect source inform the MAG 122 as the redirection destination of the additional prefix P1 (the above first option) or changing the destination address HoA (P1) of a packet to be transmitted to the MAG 122 as the redirection destination (the above third option) do not operate well. Conventional techniques for the plurality of mobility anchors are disclosed in Patent Documents 4, 6 and 10, for example. Referring now to FIG. 15, the following describes the reasons why, when a plurality of mobility anchors exist, the methods of making a mobility anchor as the redirect source inform a MAG as the redirection destination of the additional prefix P1 (the above first option) or changing the destination address HoA (P1) of a packet to be transmitted to the MAG 122 as the redirection destination (the above third option) do not operate well.

Let herein that the LMA 111 handles the first connection only via the MAG 121 using the interface 131, and the LMA 112 handles the second connection only via the MAG 122 using the interface 132. This means that the second MAG 122 as the redirect destination does not transmit a PBU message for the connection using the interface 132 to the first LMA 111 as the redirect source, and therefore the LMA 111 as the redirect source does not know what MAG the second interface 132 of the MN 130 attaches to. Accordingly, since the LMA 111 as the redirection source cannot identify the MAG 122 as the redirection destination, the LMA 111 cannot tell whether the MAG 122 is a legacy (does not know the prefix P1 of the first connection) or not, and so there is no way to inform the MAG 122 as the redirect destination of the prefix P1 assigned to the MAG 121 as the redirect source.

The method of changing an address might operate for a reception packet to the MN 130. This is because, when the destination address of a packet to be transmitted to the MAG 122 as the redirect destination is changed from HoA (P1) to HoA (P2), routing infrastructure in the local domain 110 transfers the packet to the LMA 112 as the redirection destination, and the LMA 112 transfers the packet to the MN 130 via the MAG 122. However, a problem occurs when the MN 130 wants to send out a transmission packet from the MN 130 with the same communication session. When the MN 130 changes the transmission source address of the transmission packet from HoA (P1) to HoA (P2), the LMA 111 will return the transmission source address HoA (P2) to the original address HoA (P1) prior to transmission of the transmission packet outside the local domain 110. However, since the prefix P2 is handled by the different LMA 112, the LMA 111 does not receive the transmission packet and so cannot return the transmission source address HoA (P2) to the original address HoA (P1).

Therefore, in the situation of the aforementioned assumption (2) where the plurality of anchor points (LMAs 111, 112) exist as home agents of the MN 130, the anchor point as the redirect source will always use the tunneling encapsulation (the above second option) to redirect a packet to another redirect destination interface of the mobile node that the anchor point does not manage. Therefore, when the MAG 122 as the redirect destination that the MN 130 currently attaches to is not a legacy (knows the prefix P1 of the first connection), the MN 130 uses tunneling encapsulation even when the tunneling encapsulation is not necessary. As a result, wasted processing load for the tunneling encapsulation will be unfortunately applied on the MN 130, which is not efficient.

SUMMARY OF THE INVENTION

In view of the above-stated problems, it is an object of the present invention to provide a redirection method, a redirection system, a mobile node, a home agent and a proxy node capable of eliminating wasted tunneling encapsulation and decapsulation processing by a home agent and a mobile node during redirection of a packet when a proxy node as a redirect destination knows the prefix of a redirect source.

In order to fulfill the above-stated object, a redirection method according to the present invention is for redirecting a packet of a first connection of a mobile node to a second connection of the mobile node, the first connection passing through a first home agent and a first proxy node using a first address assigned to a first interface of the mobile node, the second connection passing through a second home agent and a second proxy node using a second address assigned to a second interface of the mobile node. The method includes the steps of:

establishing a tunnel for redirection between the first and the second home agents, encapsulating, by the first home agent, a packet addressed to the first address to be addressed to the second home agent and redirecting the packet via the tunnel for redirection; and when the second proxy node knows the first address, encapsulating, by the second home agent, the packet addressed to the first address that is redirected via the tunnel for redirection to be addressed to the second proxy node for transferring.

In order to fulfill the above-stated object, a redirection system of the present invention is for redirecting a packet of a first connection of a mobile node to a second connection of the mobile node, the first connection passing through a first home agent and a first proxy node using a first address assigned to a first interface of the mobile node, the second connection passing through a second home agent and a second proxy node using a second address assigned to a second interface of the mobile node. The redirection system includes:

means that establishes a tunnel for redirection between the first and the second home agents and makes the first home agent encapsulate a packet addressed to the first address to be addressed to the second home agent on a basis of the request and redirect the packet via the tunnel for redirection; and means that, when the second proxy node knows the first address, makes the second home agent encapsulate the packet addressed to the first address that is redirected via the tunnel for redirection to be addressed to the second proxy node for transferring.

In order to fulfill the above-stated object, a mobile node of the present invention is in a redirection system for redirecting a packet of a first connection of the mobile node to a second connection of the mobile node, the first connection passing through a first home agent and a first proxy node using a first address assigned to a first interface of the mobile node, the second connection passing through a second home agent and a second proxy node using a second address assigned to a second interface of the mobile node. The mobile node includes:

means that detects whether the first and the second connections are connected simultaneously or not;

tunnel establishment request means that, when it is detected that the first and the second connections are connected simultaneously, requests the first or the second home agent to establish a tunnel for redirection between the first and the second home agents; and redirection request means that requests the first home agent to redirect a packet addressed to the first address via the tunnel for redirection.

In order to fulfill the above-stated object, a home agent of the present invention is a first home agent in a redirection system for redirecting a packet of a first connection of a mobile node to a second connection of the mobile node, the first connection passing through the first home agent and a first proxy node using a first address assigned to a first interface of the mobile node, the second connection passing through a second home agent and a second proxy node using a second address assigned to a second interface of the mobile node. The home agent includes:

means that establishes a tunnel for redirection with the second home agent; and means that encapsulates a packet addressed to the first address to be addressed to the second home agent and redirects the packet via the tunnel for redirection.

In order to fulfill the above-stated object, a home agent of the present invention is a second home agent in a redirection system for redirecting a packet of a first connection of a mobile node to a second connection of the mobile node, the first connection passing through a first home agent and a first proxy node using a first address assigned to a first interface of the mobile node, the second connection passing through the second home agent and a second proxy node using a second address assigned to a second interface of the mobile node. The home agent includes:

means that establishes a tunnel for redirection with the first home agent; and means that, when the first home agent encapsulates a packet addressed to the first address to be addressed to the second home agent and redirects the packet via the tunnel for redirection and when the second proxy node knows the first address, encapsulates the packet addressed to the first address that is redirected via the tunnel for redirection to be addressed to the second proxy node for transferring.

In order to fulfill the above-stated object, a redirection method of the present invention is for redirecting a packet of a first connection of a mobile node to a second connection of the mobile node, the first connection passing through a first home agent and a first proxy node using a first address assigned to a first interface of the mobile node, the second connection passing through a second home agent and a second proxy node using a second address assigned to a second interface of the mobile node. The redirection method includes the steps of:

establishing a tunnel for redirection between the first and the second home agents, encapsulating, by the first home agent, a packet addressed to the first address to be addressed to the second home agent and redirecting the packet via the tunnel for redirection; and when the second proxy node knows the first address, encapsulating, by the second home agent, the packet addressed to the first address that is redirected via the tunnel for redirection to be addressed to the second proxy node for transferring.

In order to fulfill the above-stated object, a redirection system of the present invention is for redirecting a packet of a first connection of a mobile node to a second connection of the mobile node, the first connection passing through a first home agent and a first proxy node using a first address assigned to a first interface of the mobile node, the second connection passing through a second home agent and a second proxy node using a second address assigned to a second interface of the mobile node. The redirection system includes:

means that establishes a tunnel for redirection between the first and the second home agents and makes the first home agent encapsulate a packet addressed to the first address to be addressed to the second home agent and redirect the packet via the tunnel for redirection; and means that, when the second proxy node knows the first address, makes the second home agent encapsulate the packet addressed to the first address that is redirected via the tunnel for redirection to be addressed to the second proxy node for transferring.

In order to fulfill the above-stated object, a home agent of the present invention is a second home agent in a redirection system for redirecting a packet of a first connection of a mobile node to a second connection of the mobile node, the first connection passing through a first home agent and a first proxy node using a first address assigned to a first interface of the mobile node, the second connection passing through the second home agent and a second proxy node using a second address assigned to a second interface of the mobile node. The home agent includes:

means that establishes a tunnel for redirection with the first home agent; and means that, when the first home agent encapsulates a packet addressed to the first address to be addressed to the second home agent and redirects the packet via the tunnel for redirection and in the case where the second proxy node knows the first address, encapsulates the packet addressed to the first address that is redirected via the tunnel for redirection to be addressed to the second proxy node for transferring.

In order to fulfill the above-stated object, a redirection method of the present invention is for redirecting a packet of a first connection of a mobile node to a second connection of the mobile node, the first connection passing through a first home agent and a first proxy node using a first address assigned to a first interface of the mobile node, the second connection passing through a second home agent and a second proxy node using a second address assigned to a second interface of the mobile node. The redirection method includes the steps of:

establishing a tunnel for redirection between the first home agent and the second proxy node knowing the first address, and encapsulating, by the first home agent, a packet addressed to the first address to be addressed to the second proxy node and redirecting the packet via the tunnel for redirection; and transferring, by the second proxy node, the packet addressed to the first address that is redirected via the tunnel for redirection to the second interface.

In order to fulfill the above-stated object, a redirection system of the present invention is for redirecting a packet of a first connection of a mobile node to a second connection of the mobile node, the first connection passing through a first home agent and a first proxy node using a first address assigned to a first interface of the mobile node, the second connection passing through a second home agent and a second proxy node using a second address assigned to a second interface of the mobile node. The redirection system includes:

means that establishes a tunnel for redirection between the first home agent and the second proxy node knowing the first address, and makes the first home agent encapsulate a packet addressed to the first address to be addressed to the second proxy node and redirect the packet via the tunnel for redirection; and means that makes the second proxy node transfer the packet addressed to the first address that is redirected via the tunnel for redirection to the second interface.

In order to fulfill the above-stated object, a mobile node of the present invention is in a redirection system for redirecting a packet of a first connection of the mobile node to a second connection of the mobile node, the first connection passing through a first home agent and a first proxy node using a first address assigned to a first interface of the mobile node, the second connection passing through a second home agent and a second proxy node using a second address assigned to a second interface of the mobile node. The mobile node includes:

means that detects whether the first and the second connections are connected simultaneously or not;

tunnel establishment request means that, when it is detected that the first and the second connections are connected simultaneously, requests to establish a tunnel for redirection between the first home agent and the second proxy node knowing the first address; and redirection request means that requests the first home agent to redirect a packet addressed to the first address via the tunnel for redirection.

In order to fulfill the above-stated object, a home agent of the present invention is a first home agent in a redirection system for redirecting a packet of a first connection of a mobile node to a second connection of the mobile node, the first connection passing through the first home agent and a first proxy node using a first address assigned to a first interface of the mobile node, the second connection passing through a second home agent and a second proxy node using a second address assigned to a second interface of the mobile node. The home agent includes:

means that establishes a tunnel for redirection with the second proxy node knowing the first address; and means that encapsulates a packet addressed to the first address to be addressed to the second proxy node and redirects the packet via the tunnel for redirection.

In order to fulfill the above-stated object, a proxy node of the present invention is a second proxy node in a redirection system for redirecting a packet of a first connection of a mobile node to a second connection of the mobile node, the first connection passing through a first home agent and a first proxy node using a first address assigned to a first interface of the mobile node, the second connection passing through a second home agent and the second proxy node using a second address assigned to a second interface of the mobile node, the second proxy node knowing the first address. The proxy node includes:

means that establishes a tunnel for redirection with the first home agent; and means that, when the first home agent encapsulates a packet addressed to the first address to be addressed to the second proxy node and redirects the packet via the tunnel for redirection, transfers the packet addressed to the first address that is redirected via the tunnel for redirection to the second interface.

In order to fulfill the above-stated object, a redirection method of the present invention is for redirecting a packet of a first connection of a mobile node to a second connection of the mobile node, the first connection passing through a first home agent and a first proxy node using a first address assigned to a first interface of the mobile node, the second connection passing through a second home agent and a second proxy node using a second address assigned to a second interface of the mobile node. The redirection method includes the step of:

detecting, by the mobile node, whether the first and the second connections are connected simultaneously or not, and when it is detected that the first and the second connections are connected simultaneously, requesting the second proxy node to establish a tunnel for redirection between the second proxy node and the first home agent; and when the request is accepted by the second proxy node, requesting, by the mobile node, to establish a tunnel for redirection between the second proxy node and the first home agent, and encapsulating, by the first home agent, a packet addressed to the first address to be addressed to the second proxy node and redirecting the packet via the tunnel for redirection.

In order to fulfill the above-stated object, a redirection system of the present invention is for redirecting a packet of a first connection of a mobile node to a second connection of the mobile node, the first connection passing through a first home agent and a first proxy node using a first address assigned to a first interface of the mobile node, the second connection passing through a second home agent and a second proxy node using a second address assigned to a second interface of the mobile node. The redirection system includes:

means that makes the mobile node detect whether the first and the second connections are connected simultaneously or not, and when it is detected that the first and the second connections are connected simultaneously, makes the mobile node request the second proxy node to establish a tunnel for redirection between the second proxy node and the first home agent; and means that, when the request is accepted by the second proxy node, makes the mobile node request to establish a tunnel for redirection between the second proxy node and the first home agent and makes the first home agent encapsulate a packet addressed to the first address to be addressed to the second proxy node and redirect the packet via the tunnel for redirection.

In order to fulfill the above-stated object, a mobile node of the present invention is in a redirection system for redirecting a packet of a first connection of a mobile node to a second connection of the mobile node, the first connection passing through a first home agent and a first proxy node using a first address assigned to a first interface of the mobile node, the second connection passing through a second home agent and a second proxy node using a second address assigned to a second interface of the mobile node. The mobile node includes:

means that detects whether the first and the second connections are connected simultaneously or not;

means that, when it is detected that the first and the second connections are connected simultaneously, requests the second proxy node to establish a tunnel for redirection between the second proxy node and the first home agent; and means that, when the request is accepted by the second proxy node, requests the first home agent to establish a tunnel for redirection between the second proxy node and the first home agent, and encapsulates a packet addressed to the first address to be addressed to the second proxy node and redirects the packet via the tunnel for redirection.

In order to fulfill the above-stated object, a home agent of the present invention is a first home agent in a redirection system for redirecting a packet of a first connection of a mobile node to a second connection of the mobile node, the first connection passing through the first home agent and a first proxy node using a first address assigned to a first interface of the mobile node, the second connection passing through a second home agent and a second proxy node using a second address assigned to a second interface of the mobile node. The home agent includes:

means that accepts a request to the first home agent from the mobile node to establish a tunnel for redirection between the second proxy node and the first home agent and redirect a packet addressed to the first address via the tunnel for redirection, encapsulates a packet addressed to the first address to be addressed to the second proxy node and redirects the packet via the tunnel for redirection.

With this configuration, when the second proxy node knows the first address, the second home agent does not further encapsulate a packet encapsulated to be addressed to the second home agent and redirected via the tunnel for redirection to be addressed to the second proxy node. Therefore, wasted tunneling encapsulation and decapsulation processing by a home agent and a mobile node can be eliminated.

According to the present invention, wasted tunneling encapsulation and decapsulation processing by a home agent and a mobile node can be eliminated during redirection of a packet when a proxy node as a redirect destination knows the prefix of a redirect source.

DESCRIPTION OF EMBODIMENTS

Figure 1:
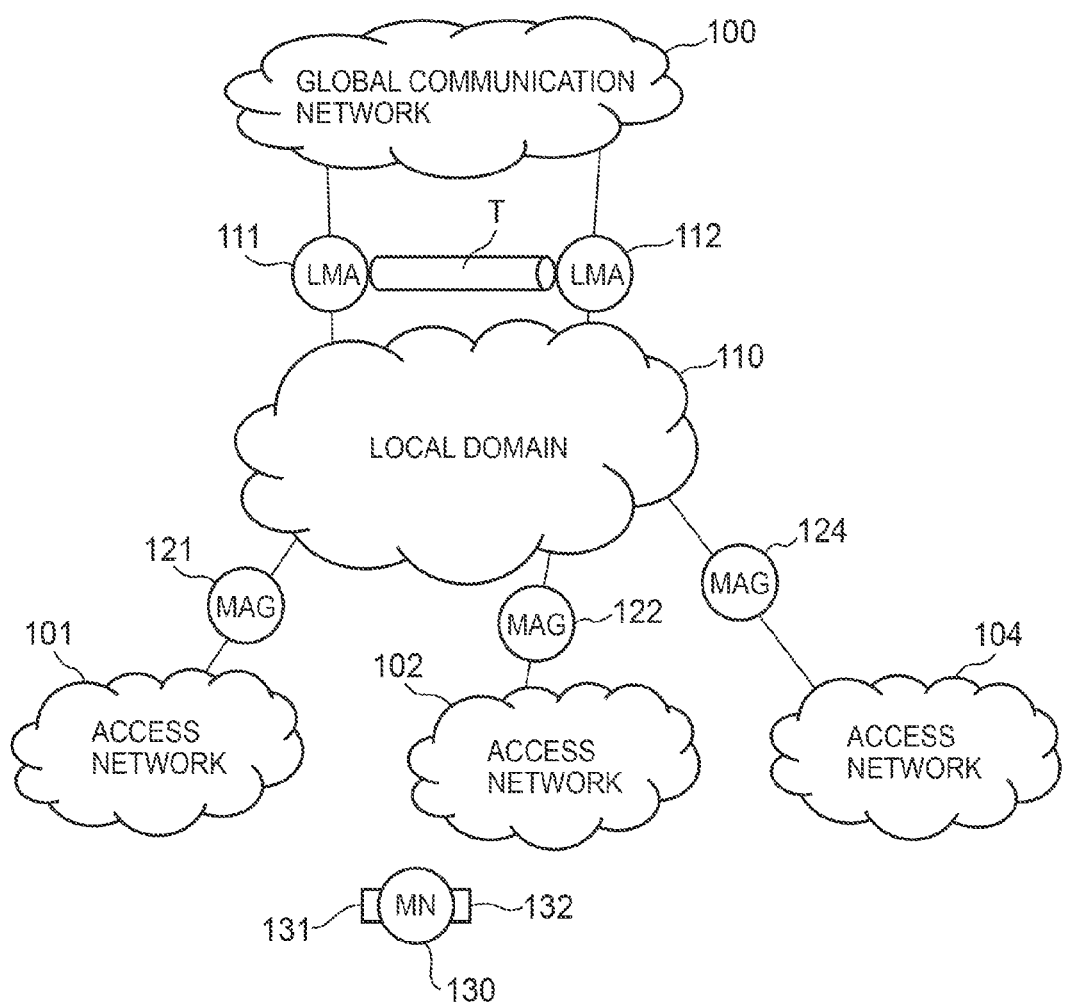
FIG. 1 is a diagram to describe a network configuration where a redirection method according to the present invention is applied.
Figure 15:
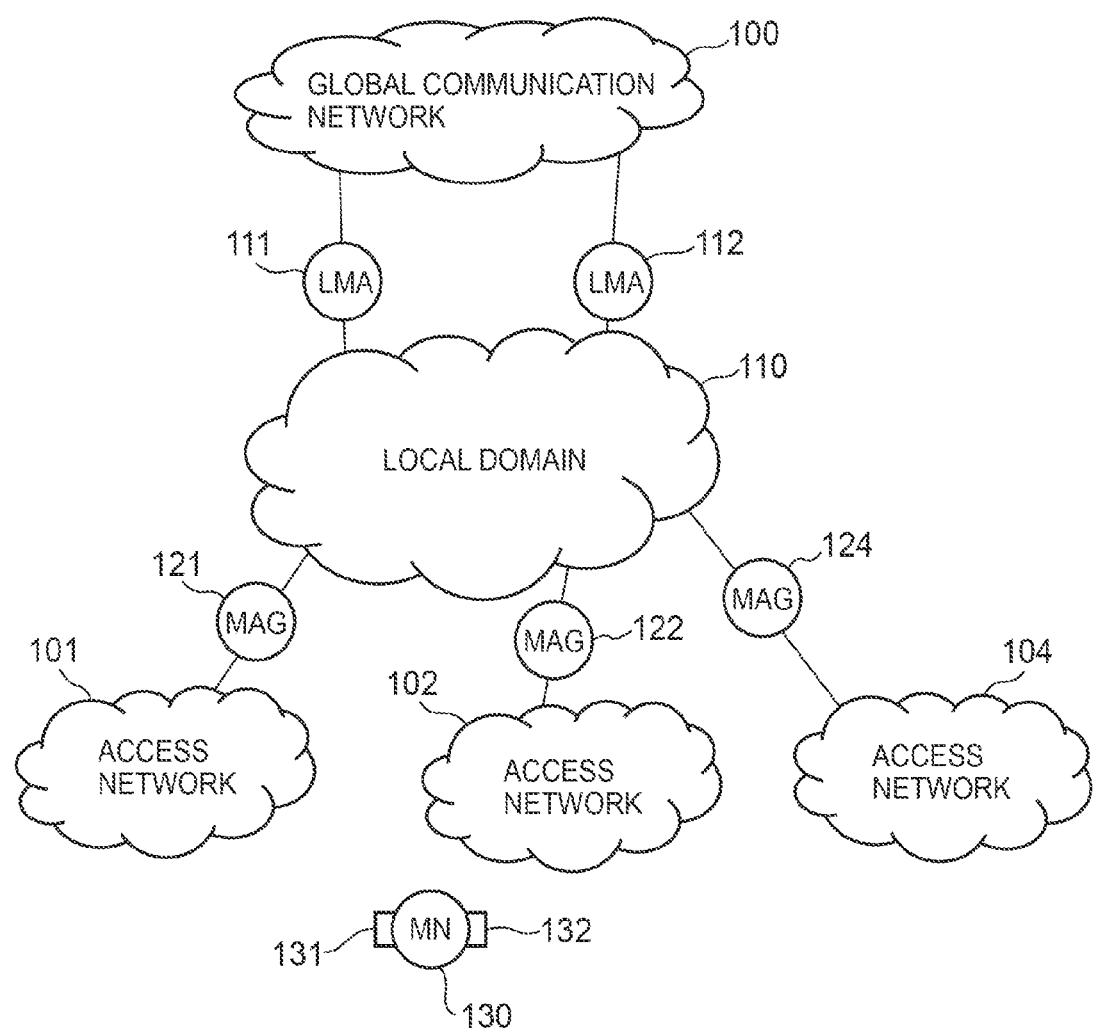
FIG. 15 shows a network configuration to describe problems to be solved by the present invention.

The following describes embodiments of the present invention, with reference to the drawings. FIG. 1 is a diagram to describe a network configuration where an embodiment of a redirection (this may called flow filtering) method according to the present invention is applied. The network configuration is the same as that of FIG. 15 except for a redirection tunnel T, and so the detailed descriptions therefor have been omitted. A mobile node (MN) 130 of the present invention has a first connection and a second connection with respect to a local domain 110 providing the MN 130 with network-based mobility management, and the first and the second connections use different prefixes P1 and P2, respectively. When a communication session needs to be moved from the first connection to the second connection (or when the necessity thereof is expected), the MN 130 firstly detects whether different LMAs 111 and 112 are used or not for local mobility anchors (LMA) managing the first connection and the second connection, respectively. When it is detected that a plurality of different LMAs 111 and 112 are used, the MN 130 requests the local domain 110 to establish a special tunnel (hereinafter called a redirection tunnel) between the LMAs 111 and 112 (or elements controlled by the LMAs 111 and 112) so as to redirect (transfer) a packet (flow) belonging to a desired communication session originally flowing via the first connection to the redirection tunnel T, and as a result to transfer the packet via the second connection.

The redirection tunnel T is established inherently to facilitate the transferring of a flow from the first connection to the second connection. In this case, since the first LMA 111 at one end of the redirection tunnel T simply has to transfer a packet via the redirection tunnel T, the LMA 111 does not have to know the ability of the mobile access gateway (MAG) 122) on the second connection. Instead, the second LMA 112 (or an element controlled by the LMA 112) at the other end of the redirection tunnel T decides how the packet is to be transferred via the second connection. This procedure achieves the objects of the present invention. The following describes the redirection tunnel T in detail.

<Overall Outline of Operation and Communication Sequence>

Figure 2:
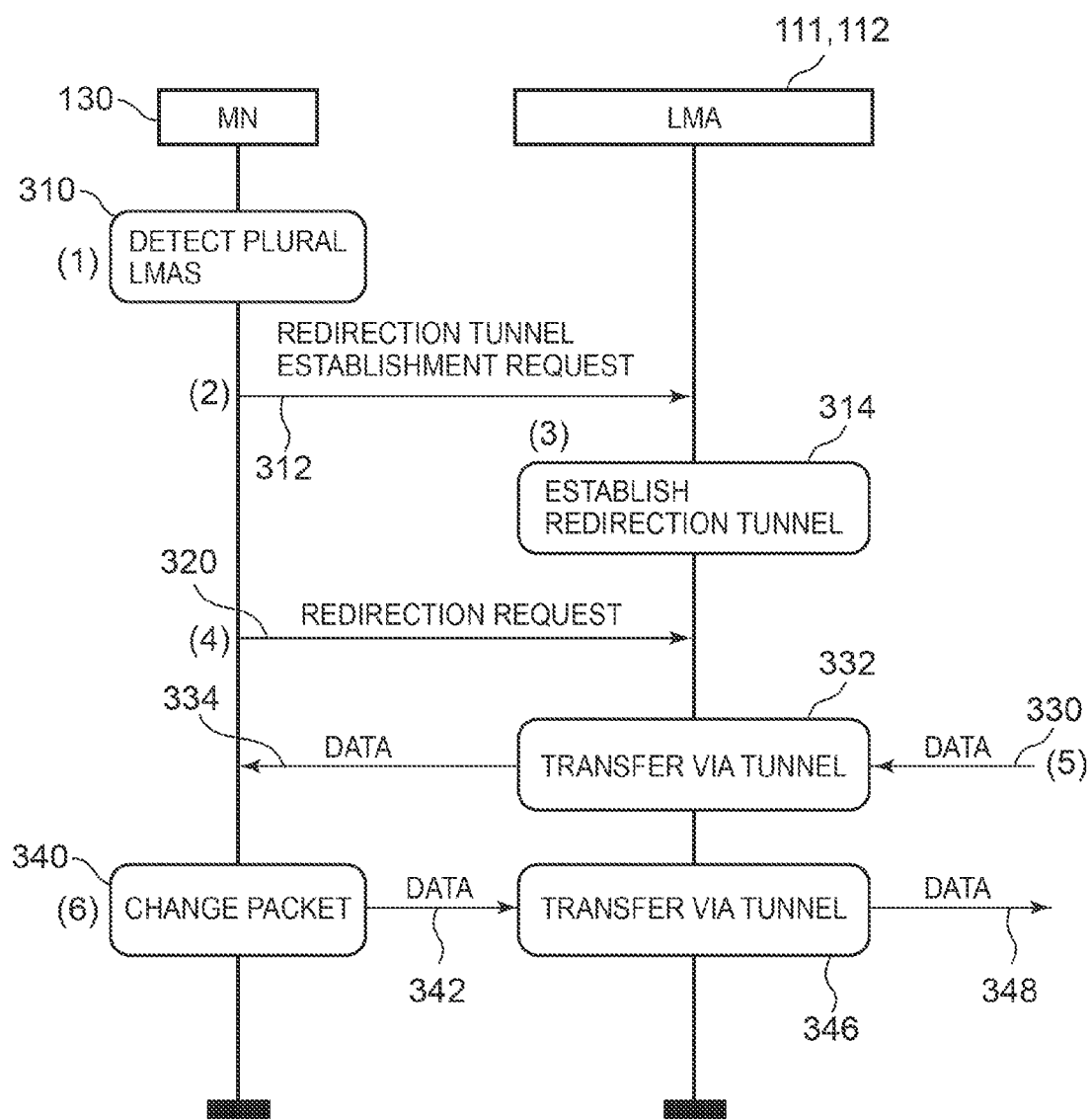
FIG. 2 shows the overall outline of operations by a MN and LMAs of FIG. 1 and a communication sequence among the MN and the LMAs.

FIG. 2 shows the overall outline of operations by the MN 130 and the LMAs 111 and 112 and of communication sequence among the MN 130 and the LMAs 111 and 112. Herein, the MN 130 connects to the local domain 110 via interfaces 131 and 132 to access a global communication network 100. The interface 131 attaches to the MAG 121 via the access network 101, and the interface 132 attaches to the MAG 122 via the access network 102. Further, on the first connection side via the interface 131, a first prefix P1 is assigned to the MN 130 and is handled by the LMA 111. On the second connection side via the interface 132, a second prefix P2 is assigned to the MN 130 and is handled by the LMA 112.

(1) When the MN 130 detects that the MN 130 accesses the global communication network 100 via the plurality of LMAs 111 and 112 in the local domain 110 (plural LMA processing 310), (2) The MN 130 decides to request establishment of a redirection tunnel T in the local domain 110, and transmits a redirection tunnel establishment request message 312 to the LMA 111 or 112 via one of the two network interfaces 131 and 132.

(3) Receiving the redirection tunnel establishment request message 312, the LMA 111 or 112 establishes the redirection tunnel T between the LMAs 111 and 112.

(4) Further, the MN 130 transfers a reception packet of the first connection addressed to the interface 131 to the other interface 132 via the redirection tunnel T, and sets up, at the LMAs 111 and 112, a redirection rule (also called a filter rule) to transmit a transmission packet of the first connection from the interface 131 via the other interface 132 and the redirection tunnel T (redirection request message 320).

(5) Receiving a reception packet 330 of the first connection addressed to the interface 131 of the MN 130 from the outside of the local domain 110, the LMA 111 follows the redirection rule to transfer the reception packet 330 to the other network interface 132 via the redirection tunnel T (334 of the drawing).

(6) When transmitting a transmission packet 342 of the first connection via the network interface 132 and the redirection tunnel T, the MN 130 performs packet change processing 340 if needed. The LMAs 111 and 112 transfer the transmission packet 342 to the outside of the local domain 110 via the redirection tunnel T (346 and 348 of the drawing). The operation shown in FIG. 2 briefly describes the principle of the present invention. The following describes embodiments in detail.

Embodiment 1

Figure 3:
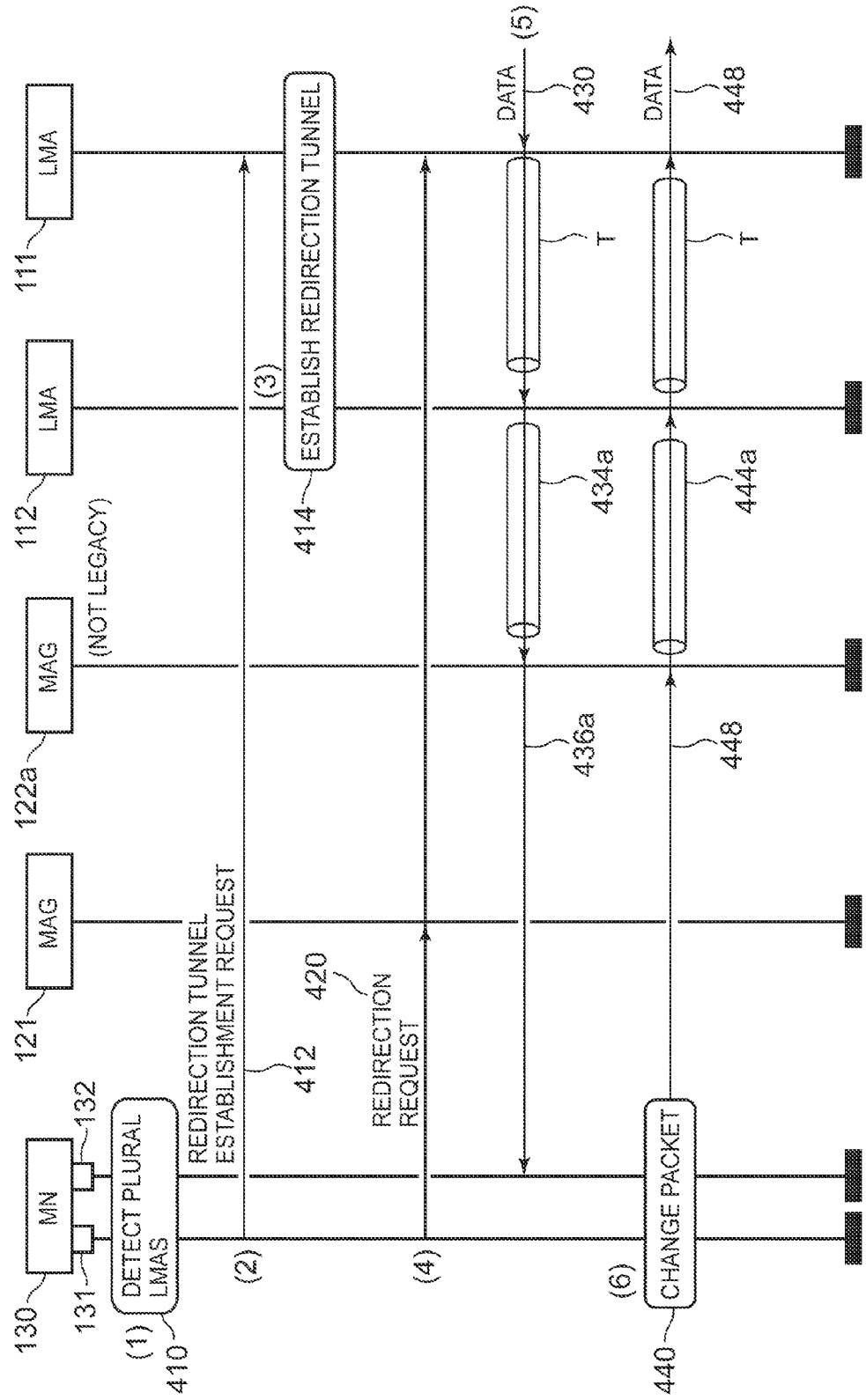
FIG. 3 is a diagram to describe a communication sequence when a MAG as a redirection destination knows the prefix of a redirection source in Embodiment 1.
Figure 4:
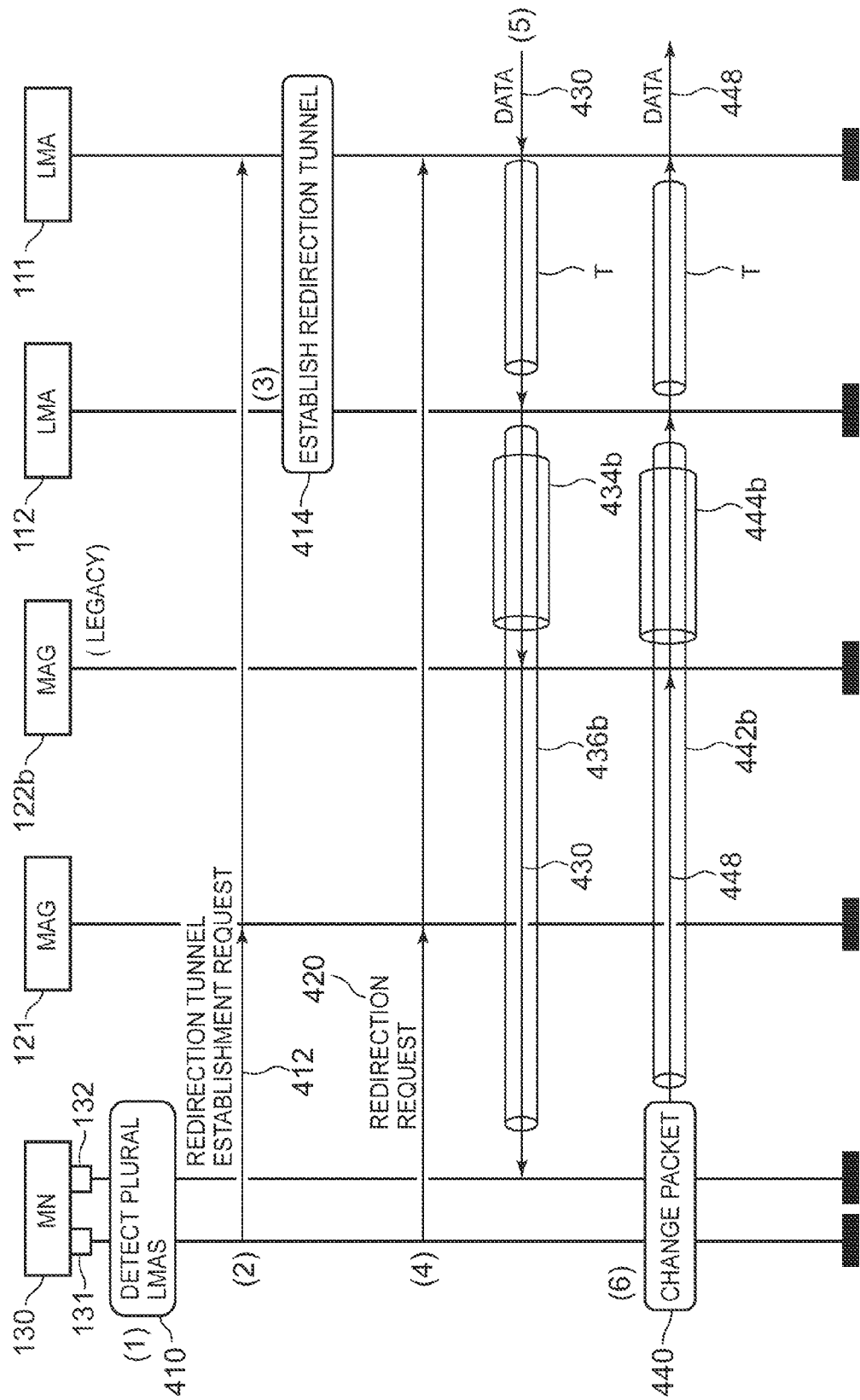
FIG. 4 is a diagram to describe a communication sequence when a MAG as a redirection destination does not know the prefix of a redirection source in Embodiment 1.

In Embodiment 1, a redirection tunnel T is established from the first LMA 111 to the second LMA 112. FIG. 3 and FIG. 4 show a message sequence in the case where a redirection tunnel establishment request message 412 and a redirection request message 420 are transmitted to the LMA 111 of the first connection as the redirect source so that a redirection tunnel T is established between the LMAs 111 and 112. Especially FIG. 3 shows the case where a MAG 122a on the second connection side as the redirect destination is not a legacy and knows the prefix P1 of the first connection. FIG. 4 shows the case where a MAG 122b on the second connection side as the redirect destination is a legacy and does not know the prefix P1 of the first connection. In FIG. 3 and FIG. 4, the same reference numerals are assigned to the same messages.

(1) As described above, let that the MN 130 wants to transfer a certain communication session of the first connection from the interface 131 to the interface 132. When the MN 130 detects that the first connection and the second connection access the global communication network 100 via different LMAs 111 and 112, respectively, (plural LMA detection 410), (2) The MN 130 transmits the redirection tunnel establishment request message 412 from the interface 131 to the LMA 111. When the MN 130 knows the LMA 111 handling the first connection of the interface 131, the message 412 can be directly transmitted to the LMA 111. Alternatively, the message 412 can be transmitted to the MAG 121 that relays the message to the LMA 111. The message 412 has to contain information (redirect destination information) on the second connection of the interface 132 of the MN 130 so as to enable the LMA 111 as the redirect source to know the termination of the redirection tunnel T. As the redirect destination information, the message 412 may contain an APN (Access Point Name) related to the second connection, the address of the LMA 112 and an interface identifier of the interface 132, for example, and further may contain the address of the MAG 122a.

(3) Receiving the message 412, the LMA 111 specifies the LMA 112 handling the second connection, and verifies so that the redirection tunnel T is authorized. Thereby, the redirection tunnel T is established between the LMAs 111 and 112 (414 of the drawing). During the establishment of the redirection tunnel T, the LMA 111 as the redirect source may have to inform the LMA 112 as the redirect destination of the prefix P1 assigned to the interface 131 so that the LMA 112 knows the passage of a packet having addresses HoA (P1) and HoA (P2) generated from the prefixes P1 and P2, respectively, through the redirection tunnel T. Although not illustrated in FIG. 3 and FIG. 4, the LMA 111 may return a response to the MN 130, indicating that the redirection tunnel T is established.

(4) Next, the MN 130 performs processing to transmit, to the LMA 111 as the redirect source, a redirection request message 420 requesting transferring of a packet flow of a communication session of the first connection via the redirection tunnel T (set-up of the redirection rule). The redirection request message 420 is transmitted directly to the LMA 111 or is relayed by the MAG 121 and is transferred to the LMA 111. Herein, the redirection request message 420 and the redirection tunnel establishment request message 412 may be transmitted with one message. The redirection request message 420 contains a parameter describing identification information on a communication session of the first connection to be transferred to the redirection tunnel T, thus enabling the LMA 111 to identify a packet belonging to the communication session. For instance, the message 420 may contain a transmission source address, a destination address HoA (P1), a transmission source port number, a destination port number, an IP flow label and a transport layer protocol identifier. Hereinafter these parameters describing the identification information on the communication session are called a redirection descriptor (Filter descriptor). (1) to (4) is common to FIG. 3 and FIG. 4.

FIG. 3 (5): When the redirection request message 420 is accepted by the LMA 111, the LMA 111 transfers a reception data packet agreeing with the redirection descriptor (Filter descriptor) to the LMA 112 via the redirection tunnel T. For instance, when the LMA 111 intercepts a reception data packet 430 addressed to HoA (P1) from the outside of the local domain 110, the LMA 111 encapsulates the packet 430 to be addressed to the LMA 112 and transfers the same via the redirection tunnel T. Receiving the encapsulation packet from the redirection tunnel T, the LMA 112 decapsulates the same into a reception data packet 430 addressed to HoA (P1) and checks the MAG 122a which is currently handling the second connection of the MN 130.

FIG. 3 shows an example where the LMA 112 knows that the MAG 122a is not a legacy and knows the prefix P1 of the first connection. Therefore, the LMA 112 can encapsulate the reception packet 430 addressed to HoA (P1) received from the redirection tunnel T to be addressed to the MAG 122a, and transmit the same via a standard PMIP tunnel 434a. The MAG 122a knowing the prefix P1 of the first connection delivers the packet 430 addressed to HoA (P1) received via the PMIP tunnel 434a to the interface 132 of the MN 130 as it is (436a of the drawing).

FIG. 4 (5): On the other hand, FIG. 4 shows an example where the LMA 112 knows that the MAG 122b is a legacy and does not know the prefix P1 of the first connection. Therefore, the LMA 112 re-encapsulates a packet addressed to HoA (P1) received via the redirection tunnel T to be a packet addressed to address HoA (P2) created from the prefix P2 and transmits the same to the MAG 122b via the normal PMIP tunnel 434b. Herein, let that the LMA 112 is informed by the MAG 122a about HoA (P2) of the MN 130 and knows HoA (P2). However, when the LMA 112 does not know HoA (P2), the LMA 112 may use any address created from the prefix P2. The MAG 122 not knowing the prefix P1 of the first connection delivers the received encapsulated packet addressed to HoA (P2) in the re-encapsulation packet to the interface 132 via a tunnel 436b. The MN 130 decapsulates this encapsulation packet 436b addressed to HoA (P2) and has to collect the original data packet 430 addressed to HoA (P1). Herein, the MN 130 may inform the LMA 111 of the address of the interface 132 with the redirection tunnel establishment request message 412. In such a case, the LMA 111 encapsulates the data packet 430 to be addressed to address HoA (P2) of the interface 132 for transmission, and the LMA 112 intercepts the packet (packet addressed to the prefix P2) transmitted by the LMA 111. When the LMA 112 intercepting the packet addressed to address HoA (P2) of the interface 132 transferred from the LMA 111 transmits the packet to the MAG 122a, the LMA 112 encapsulates the decapsulated packet to be addressed to the MAG 122a and transfers the same via the PMIP tunnel 434a. On the other hand, when the LMA 112 transmits the packet to the MAG 122b, the LMA 112 does not decapsulate the packet addressed to address HoA (P2) of the interface 132 transferred from the LMA 111 and transfers the same via the PMIP tunnel 434b. This eliminates the necessity, when the LMA 112 transmits a packet addressed to the UE 130 transferred from the LMA 111 to be addressed to the MAG 112b, to encapsulate the packet to be addressed to the prefix P2. Further, even when the LMA 112 transfers a packet received from the LMA 111 to be addressed to the MAG 112a, the LMA 112 only has to remove an external header (decapsulation), and therefore processing such as searching and setting of a destination address for the external header that is necessary for encapsulation can be eliminated.

(6) When the MN 130 wants to transmit a packet in a redirected communication session, the MN 130 firstly changes a header of the transmission packet so that the packet passes through the redirection tunnel T (packet change 440). This packet change processing 440 may require the addition of a certain layer-2 signal or encapsulation of the transmission packet 448 as shown in FIG. 4(6). Further, the fact that the transmission source address HoA (P1) of the transmission packet 448 belongs to the prefix P1 indicates that there is a need for the LMA 112 to route the transmission packet 448 via the redirection tunnel T, and as a result the transmission packet 448 does not have to be modified explicitly.

FIG. 3 (6): Herein, when the MAG 122*a* is not a legacy and knows the prefix P1 of the first connection as shown in FIG. 3, the transmission packet 448 of the transmission source address HoA (P1) is simply transferred to the MAG 122*a* without undergoing packet change. The MAG 122*a* encapsulates the transmission packet 448 to be addressed to the LMA 112, and transfers the same via a standard PMIP tunnel 444*a*. The LMA 112 knows that the transmission source address HoA (P1) of the transmission packet 448 is an address configured from the prefix P1, and encapsulates the transmission packet 448 to be addressed to the LMA 111 and transfers the same via the redirection tunnel T. Finally, the LMA 111 decapsulates the encapsulation packet received via the redirection tunnel T into the transmission packet 448, and sends out the same to the outside of the local domain 110.

FIG. 4(6): On the other hand, when the MAG 122*b* is a legacy and does not know the prefix P1 of the first connection as shown in FIG. 4, the MN 130 encapsulates, in the packet change processing 440, the transmission packet 448 of the transmission sources address HoA (P1) to be addressed to the LMA 112, and transmits the same via a tunnel 442*b*. The transmission source address of the encapsulation packet via the tunnel 442*b* is the address HoA (P2) generated from the prefix P2, and the destination address thereof is the address of the LMA 112. Therefore, this encapsulation packet via the tunnel 442*b* passes through an Ingress filtering function of the MAG 122*b*, and further is encapsulated to be addressed to the LMA 112 and reaches the LMA 112 via the standard PMIP tunnel 444*b*. The LMA 112 decapsulates the received encapsulation packet twice to obtain the original transmission packet 448, and knows that the transmission source address HoA (P1) is an address configured from the prefix P1. Therefore, the transmission packet 448 is encapsulated to be addressed to the LMA 111 and is transferred via the redirection tunnel T, and the LMA 111 receiving the encapsulation packet sends out the transmission packet 448 subjected to decapsulation.

As stated above, according to the preferable Embodiment 1 of the present invention, the redirection tunnel T leads to the following effect. That is, when the MAG 122*a* as the redirect destination the MN 130 currently attaches to is not a legacy (knowing the prefix P1 of the first connection) as shown in FIG. 3, encapsulation is not used as in the tunnels 436*b* and 442*b* shown in FIG. 4, and so wasted tunneling encapsulation and decapsulation processing by the LMAs 111 and 112 and the MN 130 can be eliminated.

Embodiment 2

Figure 5:
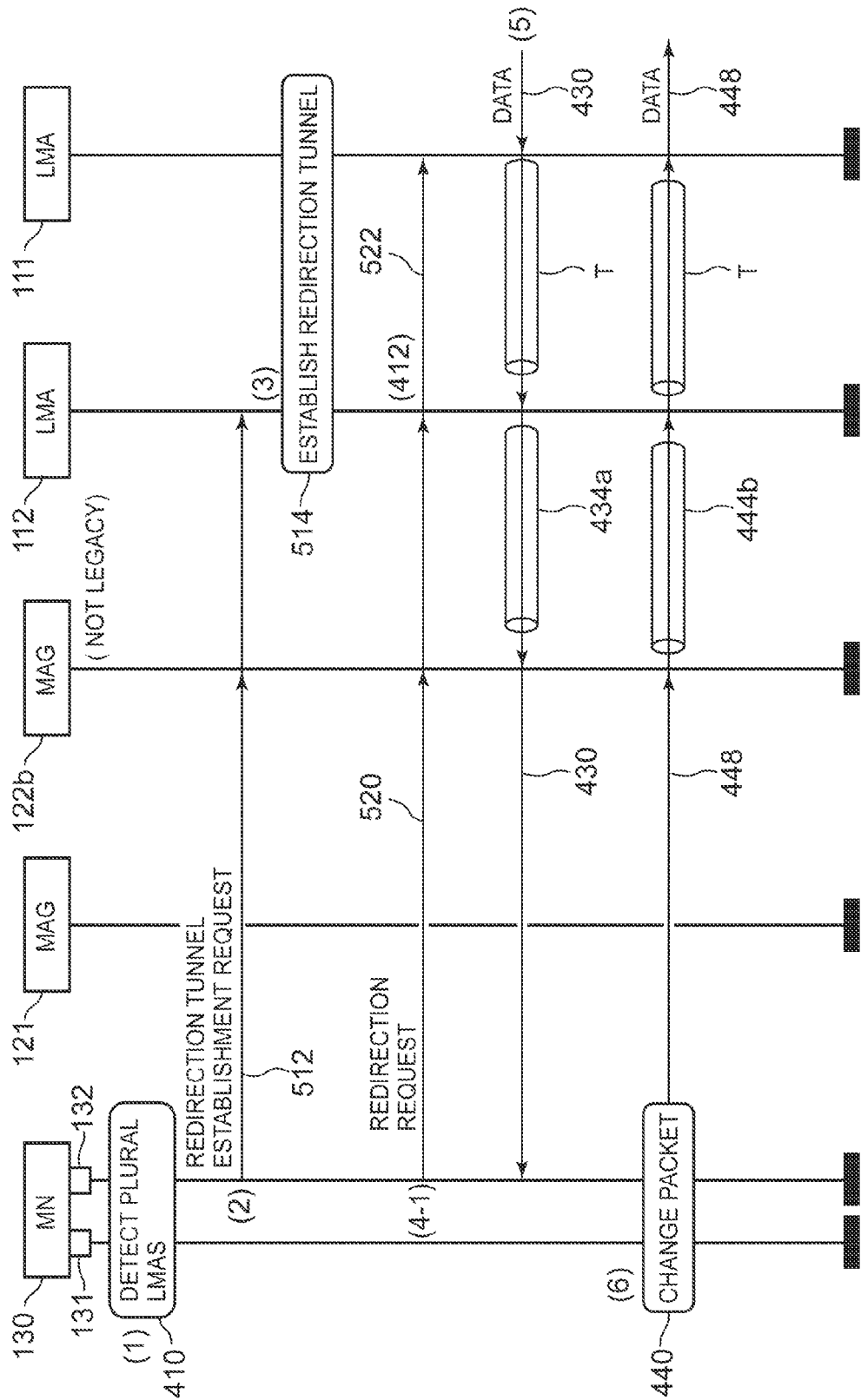
FIG. 5 is a diagram to describe a communication sequence when a MAG as a redirection destination knows the prefix of a redirection source in Embodiment 2.

In Embodiment 2, a redirection tunnel T is established from a second LMA 112 to a first LMA 111. In FIG. 3 and FIG. 4 of Embodiment 1, the MN 130 transmits the redirection tunnel establishment request message 410 and the redirection request message 420 to the LMA 112 of the second connection. On the other hand, in Embodiment 2, this request is transmitted via the second connection. FIG. 5 corresponds to FIG. 3, where a request from the MN 130 is transmitted to the second LMA 112.

(1) As described above, let that the MN 130 wants to transfer a certain communication session of the first connection from the interface 131 to the interface 132. When the MN 130 detects that the first connection and the second connection access the global communication network 100 via different LMAs 111 and 112, respectively, (plural LMA detection 410), (2) the MN 130 transmits a redirection tunnel establishment request message 512 from the interface 132 to the LMA 112. When the MN 130 knows the LMA 112 handling the connection of the interface 132, the message 512 can be directly transmitted to the LMA 112. Alternatively, the message 512 can be transmitted to the MAG 122*a* that relays the message to the LMA 112. The message 512 has to contain information (redirect source information) on the first connection of the interface 131 of the MN 130 so as to enable the LMA 112 to know the termination of the redirection tunnel T. As the redirect source information, the message 512 may contain an APN (Access Point Name) related to the first connection, the address of the LMA 111 and an interface identifier of the interface 131, for example, and further may contain the address of the MAG 121.

(3) Receiving the message 512, the LMA 112 specifies the LMA 111 handling the first connection, and verifies so that the redirection tunnel T is authorized. Thereby, the redirection tunnel T is established between the LMAs 111 and 112 (514 of the drawing). Although not shown in FIG. 5, the LMA 112 may return a response to the MN 130, indicating that the redirection tunnel T is established.

(4-1) Next, the MN 130 can shift to processing to transmit, from the interface 132 to the LMA 112, a redirection request message 520 requesting to transfer a packet flow of a communication session from the first connection to the second connection of the LMA 112 via the redirection tunnel T (set-up of the redirection descriptor). Similarly, the redirection request message 520 can be directly transmitted to the LMA 112, or can be relayed by the MAG 122*a* and be transferred to the LMA 112. The LMA 112 knows based on a redirection descriptor in the message 520 that this redirection descriptor is for a packet having address HoA (P1) configured from the prefix P1.

(4-2) Since the redirection tunnel T is already established with the LMA 111 handling the prefix P1, the LMA 112 simply informs the LMA 111 of this redirection descriptor (522 of the drawing). Therefore, this redirection descriptor is installed in the LMA 111, and a reception packet matching with this redirection descriptor is transferred via the redirection tunnel T similarly to FIG. 3. Since the message sequences (5) and (6) of a data packet in FIG. 5 with the same reference numerals as those in FIG. 3 are the same as in FIG. 3 (5) (6), the description thereof is omitted. Therefore, when the MAG 122*a* as the redirect destination is not a legacy (knowing the prefix P1 of the first connection), encapsulation as in the tunnels 436*b* and 442*b* shown in FIG. 4 is not used, and so wasted tunneling encapsulation processing by the MN 130 can be eliminated.

Herein, the redirection request message 520 and the tunnel establishment request message 512 may be transmitted with one message. Additionally, there is no need to transmit these request messages 520 and 512 to the same LMA. For instance, the tunnel establishment request message 512 may be transmitted to the LMA 112, and the redirection request message 520 may be transmitted to the LMA 111. Conversely, the tunnel establishment request message 512 may be transmitted to the LMA 111, and the redirection request message 520 may be transmitted to the LMA 112.

Embodiment 3

In Embodiment 3, a second LMA 112 as the redirect destination changes the address of a packet. In FIG. 3 of Embodiment 1 and in FIG. 5 of Embodiment 2 where the MAG 122*a* not a legacy establishes the second connection, the MAG 122*a* executes direct transfer (packets 430, 448). On the other hand, in FIG. 4 of Embodiment 1 where the MAG 122*b* as a legacy establishes the second connection, the MAG 122*b* uses a packet encapsulation (tunnels 436*a*, 442*b*) to be addressed to the second interface 132 of the MN 130. Herein, this encapsulation is not preferable and has to be avoided even when the MAG 122*b* is a legacy because the encapsulation increases processing load for the MN 130 and a packet size. One of preferable methods therefor is to change the address, and FIG. 6 shows such a method as Embodiment 3.

Figure 6:
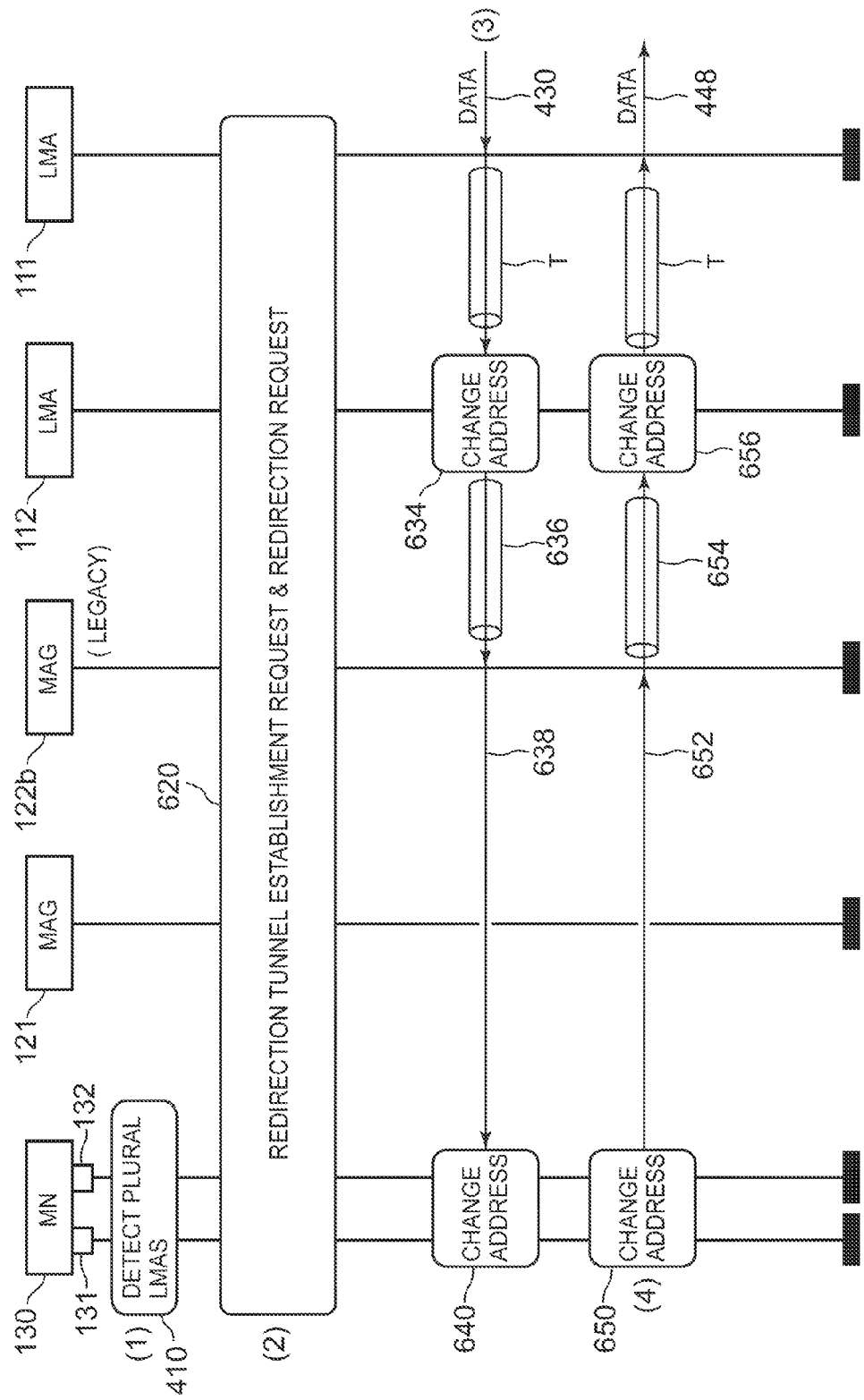
FIG. 6 is a diagram to describe a communication sequence when a MAG as a redirection destination does not know the prefix of a redirection source in Embodiment 3.

In FIG. 6, the MAG 122*b* as the redirection destination is a legacy and does not know the prefix P1 that the LMA 111 as the redirection source assigns to the MN 130.

(1) Firstly, when executing plural LMA detection processing 410, the MN 130

(2) executes a redirection tunnel establishment request for establishment of a redirection tunnel T between the LMAs 111 and 112, and executes a redirection request (processing 620). FIG. 6 is different in that, in processing 620, the MN 130 instructs to use address change for the MAG 122*b* as a legacy with the redirection tunnel establishment request and the redirection request. The MN 130 describes, in this instruction, that address Addr(P2) generated from the prefix P2 assigned to the second connection that is handled by the LMA 112 as the redirection destination is a proxy address of address HoA (P1) in the prefix P1 assigned to the first connection that is handled by the LMA 111 as the redirection source. Addr(P2) may be generated by the MN 130 and may be reported to the LMA 112, or may be generated by the LMA 112. When the redirection rule is installed and the redirection tunnel T is established, the LMA 112 as the redirection destination is further informed of the proxy relationship between address HoA (P1) and address Addr(P2) as a redirection descriptor. Herein, address Addr(P2) may be HoA (P2) that the UE uses in the second connection.

(3) Receiving a reception packet 430 addressed to address HoA (P1) matching with the redirection descriptor, the LMA 111 as the redirection source encapsulates the reception packet 430 to be addressed to the LMA 112, and transfers the same via the redirection tunnel T. Since the LMA 112 knows that the MAG 122*b* as the redirection destination is a legacy and so does not know the prefix P1, the LMA 112 executes address change processing 634 on the basis of the above-mentioned proxy relationship between address HoA (P1) and address Addr(P2) to change the destination address HoA (P1) of the reception packet 430 to address Addr(P2), and further encapsulates a packet 638 with this destination address Addr (P2) to be addressed to the MAG 122*b* and transfers the same via a PMIP tunnel 636.

Since the packet 638 with this destination address Addr (P2) has a valid address in the range of the prefix P2 assigned to the interface 132, the MAG 112*b* transfers the packet 638 to the MN 130 as it is. Receiving the packet 638, the MN 130 knows that the destination address Addr(P2) of the packet 638 is an address in the range of the prefix P2 and is a special proxy address for HoA (P1). Since the MN 130 restores the original address HoA (P1) before the processing of the packet 638, the MN 130 can process the packet 638 with the destination address HoA (P2) as the reception packet 430 addressed to address Addr(P1).

(4) As for a transmission packet 652, the MN 130 changes the transmission source address HoA (P1) to the proxy address Addr(P2) before the transmission of the transmission packet, and transmits the packet 652 as it is (650). Since the transmission source address Addr(P2) of the transmission packet 652 is a valid address in the range of the prefix P2, the MAG 112*b* can let the transmission packet 652 pass therethrough, and encapsulates the transmission packet 652 to be addressed to the LMA 112 and transfers the same via a standard PMIP tunnel 654. The LMA 112 knows that the transmission source address Addr(P2) of the transmission packet 652 is a special proxy address for HoA (P1) that is described by the MN 130 at the processing 620. Then, the LMA 112 changes the transmission source address Addr(P2) to the original address HoA (P1) (656), and encapsulates the packet 652 with the transmission source address HoA (P2) to be addressed to the LMA 111 and transmits the same via the redirection tunnel T. The LMA 111 decapsulates the received packet and sends out a transmission packet 448 thereof.

As described above, according to Embodiment 3, the redirection tunnel T and change of the destination address and the transmission source address can eliminate the encapsulation as in the tunnels 436*b* and 442*b* shown in FIG. 4 even when the MAG 122*b* as the redirection destination is a legacy and does not know the prefix P1 of the first connection, and therefore wasted tunneling encapsulation processing by the MN 130 can be eliminated.

Embodiment 4

In Embodiment 4, the second LMA 112 transfers a transmission packet directly to the outside of the local domain 110 without letting the packet pass through the first LMA 111. In the aforementioned Embodiments 1 to 3, the second LMA 112 transmits the transmission packet 448 to the first LMA 111 via the redirection tunnel T as shown in FIG. 3 to FIG. 6. This is because the transmission source address HoA (P1) of the transmission packet 448 is configured from the prefix P1 handled by the first LMA 111. This processing aims to avoid Ingress filtering at an exit router of the second LMA 112. However, when the second LMA 112 knows the absence of such Ingress filtering at the exit router, the LMA 112 can transmit the transmission packet 448 directly to the outside of the local domain 110 without letting the packet pass through the first LMA 111.

Embodiment 5

Embodiment 5 assumes the case where a communication session is transferred into the local domain 110. The aforementioned Embodiments 1 to 4 assume the case where a communication session is transferred to the outside of the local domain 110 as shown in FIG. 1. The following describes Embodiment 5 where all peer nodes of a communication session are located inside the local domain 110. In this Embodiment 5, the second LMA 112 intercepts a packet of the communication session and transfers the same to a target destination without passing the packet through the redirection tunnel T, i.e., the first LMA 111.

The embodiment is described below, with reference to FIG. 1 as an example. As described above, the MN 130 has two connections. In the first connection, the interface 131 attaches to the MAG 121 via the access network 101, and in the second connection, the interface 132 attaches to the MAG 122 via the access network 102. In the first and the second connections via the interfaces 131 and 132, respectively, the first prefix P1 and the second prefix P2 are assigned to the MN 130, which are handled by the LMAs 111 and 112, respectively. Let herein that the MN 130 communicates in the first connection using a peer node (not illustrated) located in a third access network 104 in the same local domain 110 and address HoA (P1). A mobility session of this peer node is handled by a third MAG 124 of the access network 104 and the second LMA 112.

After establishing a redirection tunnel T to transfer a flow with this peer node from the first connection to the second connection and setting up a redirection rule, the second LMA 112 knows that a packet with the destination address of HoA (P1) coming from the peer node will be transferred to the second LMA 112 by the third MAG 124. In Embodiments 1 to 4, since the destination address HoA (P1) is created from the prefix P1 handled by the first LMA 111, the LMA 112 transfers this packet to the LMA 111. Then, in Embodiment 5, the LMA 112 knows that, when this packet is transferred firstly to the LMA 111 via the redirection tunnel T, this packet will be returned back to itself via the redirection tunnel T. Then, the LMA 112 does not transfer this packet to the LMA 111 firstly, but directly transfers the packet to the second connection of the MN 130.

Similarly, when the MN 130 transmits a packet to a peer node using the second connection, the second MAG 122 transfers this packet to the second LMA 112. Normally the second LMA 112 will transfer this packet to the LMA 111 via the redirection tunnel T. However, the LMA 112 can know that the destination address of this packet is an address HoA (P2)' created from the prefix P2 handled by itself. Then, the second LMA 112 knows that, if this packet with the destination address of HoA (P2)' is firstly transferred to the LMA 111 via the redirection tunnel T, this packet will be returned back to itself via the redirection tunnel T. Then, the LMA 112 does not transfer this packet with the destination address of HoA (P2)' to the LMA 111 firstly, but directly transfers the packet to the third MAG 124.

Embodiment 6

Figure 7:
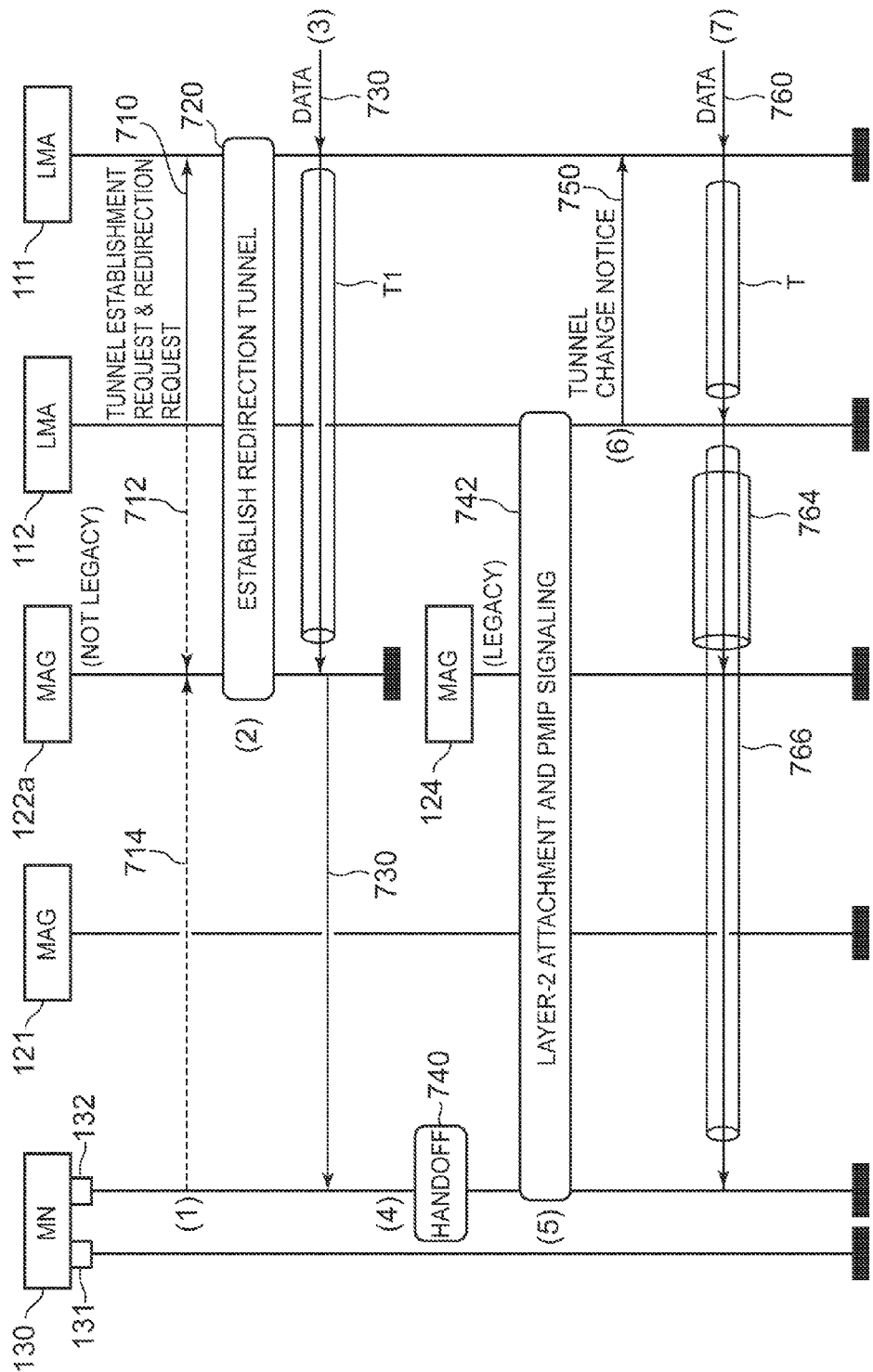
FIG. 7 is a diagram to describe a communication sequence when a MAG as a redirection destination does not know the prefix of a redirection source in Embodiment 6.

In Embodiment 6, as shown in FIG. 7, a redirection tunnel T is directly established from the first LMA 111 and the second MAG 122a. In the aforementioned Embodiments 1 to 5, the redirection tunnel T is established between the LMA 111 of the first connection and the LMA 112 of the second connection, whereas in this Embodiment 6, the redirection tunnel T is established between the LMA 111 of the first connection and the MAG 122a of the second connection. This method enables packet redirection via a better path.

Referring firstly to FIG. 1, the following describes an example. As described above, the MN 130 has two connections. In the first connection, the interface 131 attaches to the MAG 121 via the access network 101, and in the second connection, the interface 132 attaches to the MAG 122 via the access network 102. In the first and the second connections via the interfaces 131 and 132, respectively, the first prefix P1 and the second prefix P2 are assigned to the MN 130, which are handled by the LMAs 111 and 112, respectively.

In Embodiment 6, let further that, after a certain time period has elapsed, the MN 130 moves and the second interface 132 performs a handoff from the access network 102 to the third access network 104. As a result, the second connection also performs a handoff from the MAG 122 to the third MAG 124 for redirection. Let further that the second MAG 122a is not a legacy and knows the prefix P1 of the first connection, whereas the third MAG 124 is a legacy and does not know the prefix P1 of the first connection.

FIG. 7 shows communication sequence of Embodiment 6.

(1) Before handoff: The second LMA 112 knows that the MAG 122a as a current proxy node is not a legacy. Therefore, the LMA 112 transmits a redirection tunnel establishment request and redirection request message 710 to the LMA 111 to notice the LMA 111 to set up a redirection tunnel T with the MAG 122a. As an alternative notice route for the message 710, as indicated with a dashed line, the LMA 112 may transmit a message 712 to the MAG 122a to inform so as to set up the redirection tunnel T1 with the LMA 111. As a further alternative, as indicated with a dashed line, the MN 130 may transmit a message 714 from the interface 132 to the MAG 122a to inform so as to set up the redirection tunnel T1 with the LMA 111. Any notice route can establish the redirection tunnel T1 between the first LMA 111 and the second MAG 122a (processing 720).

(3) Receiving a reception data packet 730 of the second connection (destination is HoA (P2)) matching with a redirection descriptor, the LMA 111 encapsulates this packet 730 to be addressed to the MAG 122a and transfers the same via the redirection tunnel T1. The MAG 122a transfers the packet 730 with the destination address of HoA (P2) to the second interface 132 of the MN 130. Although not illustrated in the drawing, a transmission packet the MN 130 transmits is transferred via the opposite path.

(4) After handoff: Let that, after a certain time period has elapsed, the MN 130 moves and the second interface 132 performs a handoff from the access network 102 to the third access network 104 (740 of the drawing). In this handoff processing 740, a proxy node as a proxy for the second connection is changed from the second MAG 122a to the third MAG 124.

(5) This handoff processing 740 includes processing 742 for layer-2 attachment between the MN 130 and the third MAG 124 and PMIP signaling (PBU+PBA) between the third MAG 124 and the second LMA 112.

(6) Since it is assumed that the third MAG 124 is a legacy and does not know the prefix P1 of the first connection, the second LMA 112 informs the first LMA 111 that the redirection tunnel T1 cannot be used between the LMA 111 and the third MAG 124 and requests to establish a new redirection tunnel T between the LMA 111 and the LMA 112 (tunnel change notice 750 of the drawing).

(7) Therefore, receiving a reception data packet 760 of the second connection (destination is HoA (P2)) matching with the redirection descriptor, the first LMA 111 encapsulates this packet 760 to be addressed to the second LMA 112 and transfers the same via the redirection tunnel T. The second LMA 112 further encapsulates the packet addressed to HoA (P2) received via the redirection tunnel T in a packet addressed to an address in the range of the prefix P2 and transmits the same to the third MAG 124 via a normal PMIP tunnel 764. The third MAG 124 transfers this packet 766 addressed to HoA (P2) in the packet to the second interface 132. The MN 130 has to decapsulate this packet 766 to collect a reception data packet 760 with the original destination address of HoA (P1). Although not illustrated, a transmission packet the MN 130 transmits is transferred via the opposite path.

Let herein that the third MAG 124 is not a legacy and knows the prefix P1 of the first connection. In this case, the tunnel change notice 750 that the second LMA 112 transmits to the first LMA 111 in FIG. 7(6) requests to move the redirection tunnel T1 between the first LMA 111 and the second MAG 122a to between the first LMA 111 and the third MAG 124 and establish the redirection tunnel. As described above, the present embodiment uses the redirection tunnel T1 and therefore when the MAG 124 as the handoff destination is not a legacy (knowing the prefix P1 of the first connection), encapsulation as the tunnel 766 shown in FIG. 7 is not used. Accordingly the present embodiment can eliminate wasted tunneling encapsulation and decapsulation processing by the LMA 112 and the MN 130.

Embodiment 7

In Embodiment 7, the MN 130 informs the first LMA 111 of information on the second connection. In FIG. 7(1) of the aforementioned Embodiment 6, the first LMA 111 does not know the details of the second connection of the MN 130 but establishes the redirection tunnel T1 between the LMA 111 and the MAG 122a. In Embodiment 7, however, the MN 130 informs the first LMA 111 of information on the second connection, and the first LMA 111 decides the most efficient form to transfer a session on the basis of the information on the second connection.

Figure 8:
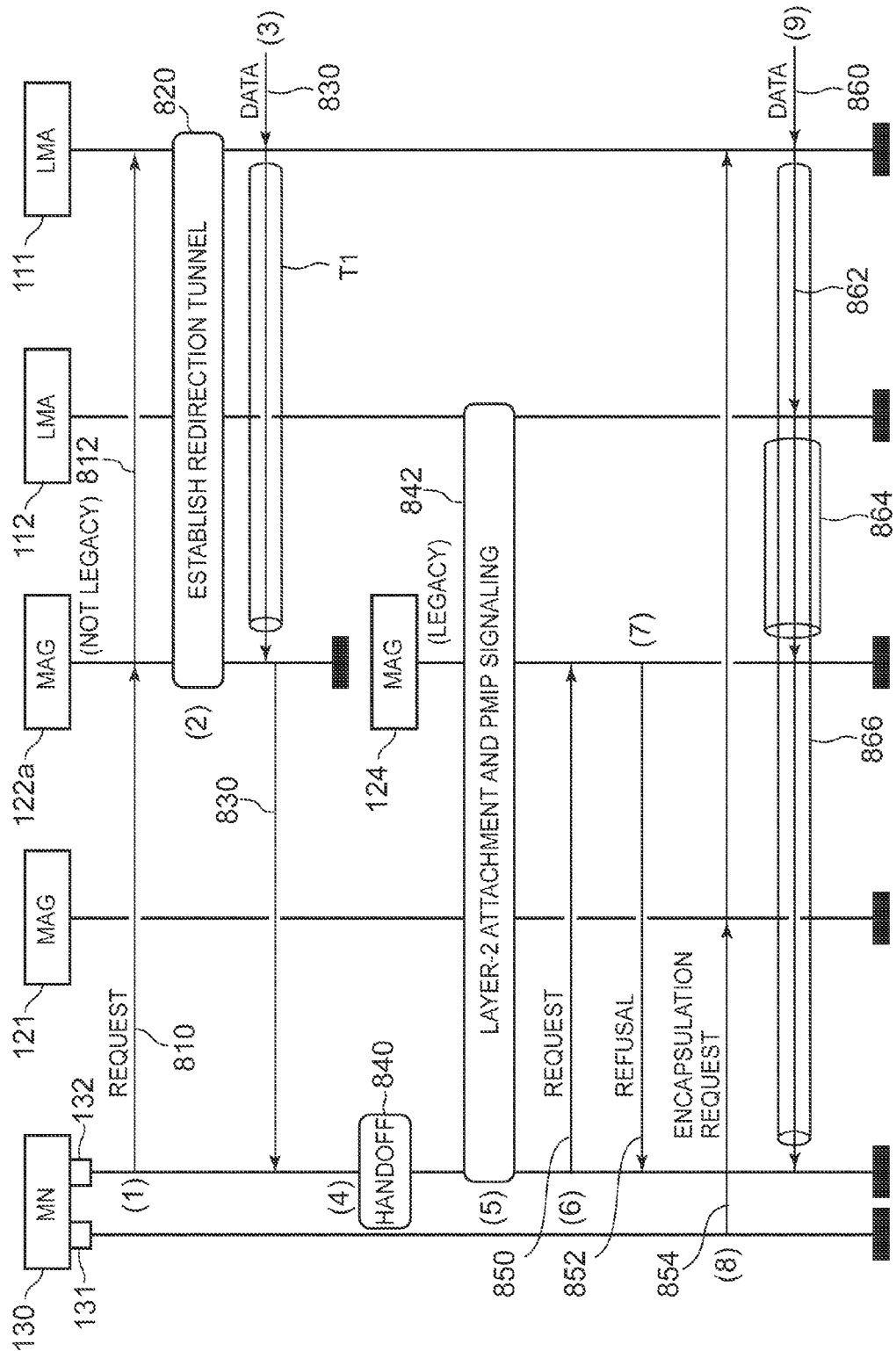
FIG. 8 is a diagram to describe a communication sequence when a MAG as a handoff destination does not know the prefix of a redirection source in Embodiment 7.

Referring to FIG. 8 as an example, the following describes Embodiment 7. As described above, the MN 130 has two connections. In the first connection, the interface 131 attaches to the MAG 121 via the access network 101, and in the second connection, the interface 132 attaches to the MAG 122 via the access network 102. In the first and the second connections via the interfaces 131 and 132, respectively, the first prefix P1 and the second prefix P2 are assigned to the MN 130, which are handled by the LMAs 111 and 112, respectively. Let that, after a certain time period has elapsed, the MN 130 moves and the second interface 132 performs a handoff from the access network 102 to the third access network 104. As a result, the second connection also performs a handoff from the MAG 122 to the third MAG 124. Let further that the second MAG 122a is not a legacy and knows the prefix P1 of the first connection, whereas the third MAG 124 is a legacy and does not know the prefix P1 of the first connection.

(1) Before handoff: the MN 130 transmits a redirection tunnel establishment request and redirection request message 810 from the interface 132 to the second MAG 122a as a current proxy node so as to request establishing a redirection tunnel T1 with the first LMA 111. Since the second MAG 122a is not a legacy and knows the prefix P1 of the first connection, the second MAG 122a relays the request message 810 to the first LMA 111 (request message 812). Herein, the request message 810 addressed to the second MAG 122a has to explicitly describe a parameter of the first connection so that the second MAG 122a can use this parameter to dispose the LMA 111 of the first connection. Examples of the parameter of the first connection may include, but are not limited to, the address of the first LMA 111 and an APN of the first connection in a 3GPP scenario.

(2) Then, the redirection tunnel T1 is established between the first LMA 111 and the second MAG 122a.

(3) Therefore, receiving a reception data packet 830 addressed to HoA (P1) matching with a redirection descriptor, the LMA 111 encapsulates this packet 830 to be addressed to the MAG 122a and transfers the same via the redirection tunnel T1. The MAG 122a that is not a legacy transfers this packet 830 addressed to HoA (P1) to the second interface 132 of the MN 130. Although not illustrated in the drawing, a transmission packet the MN 130 transmits can be transferred via the opposite path.

(4) After handoff: Let that, after a certain time period has elapsed, the MN 130 moves and the second interface 132 performs a handoff from the access network 102 to the third access network 104 (840 of the drawing). In this handoff processing 840, the MAG as a proxy for the second connection is changed from the second MAG 122a to the third MAG 124.

(5) This handoff processing 840 includes processing 842 for layer-2 attachment and PMIP signaling (PBU+PBA).

(6) The MN 130 retransmits a redirection tunnel establishment request and redirection request message 850 from the interface 132 to the third MAG 124.

(7) Herein, since the MAG 124 is a legacy and does not know the prefix P1 of the first connection, the MAG 124 returns a refusal message 852 back to the MN 130 in response to the request message 850.

(8) The MN 130 knows that the MAG 124 is a legacy on the basis of the refusal message 852, and transmits an encapsulation request message 854 from the first interface 131 to the first LMA 111 to request to use packet encapsulation addressed to HoA (P1). The encapsulation request message 854 may be transmitted directly from the first interface 131 to the first LMA 111, or may be relayed by the first MAG 121.

(9) Therefore, when the first LMA 111 intercepts the reception data packet 860 addressed to HoA (P1) matching with the redirection descriptor, the first LMA 111 encapsulates this packet 860 in a tunnel packet 866 addressed to HoA (P2). Since this HoA (P2) is configured from the prefix P2, the tunnel packet 866 is firstly routed to the second LMA 112 (862 of the drawing). The second LMA 112 re-encapsulates the tunnel packet 866 to be addressed to the third MAG 124 and transfers the same via a standard PMIP tunnel 864. The third MAG 124 transfers the tunnel packet 866 addressed to HoA (P2) in the reception packet to the second interface 132 of the MN 130. The MN 130 has to decapsulate this packet 866 addressed to HoA (P2) to collect a reception data packet 860 addressed to the original HoA (P1). Although not illustrated, a transmission packet the MN 130 transmits can be transferred via the opposite path.

Let herein that the third MAG 124 is not a legacy and knows the prefix P1 of the first connection. In this case, the request message 850 that the MN 130 transmits from the second interface 132 in FIG. 8(6) is accepted by the third MAG 124 similarly to FIG. 8(1) and is relayed to the first LMA 111, and the redirection tunnel T is moved from the second MAG 122 to the third MAG 124.

Embodiment 8

Figure 9:
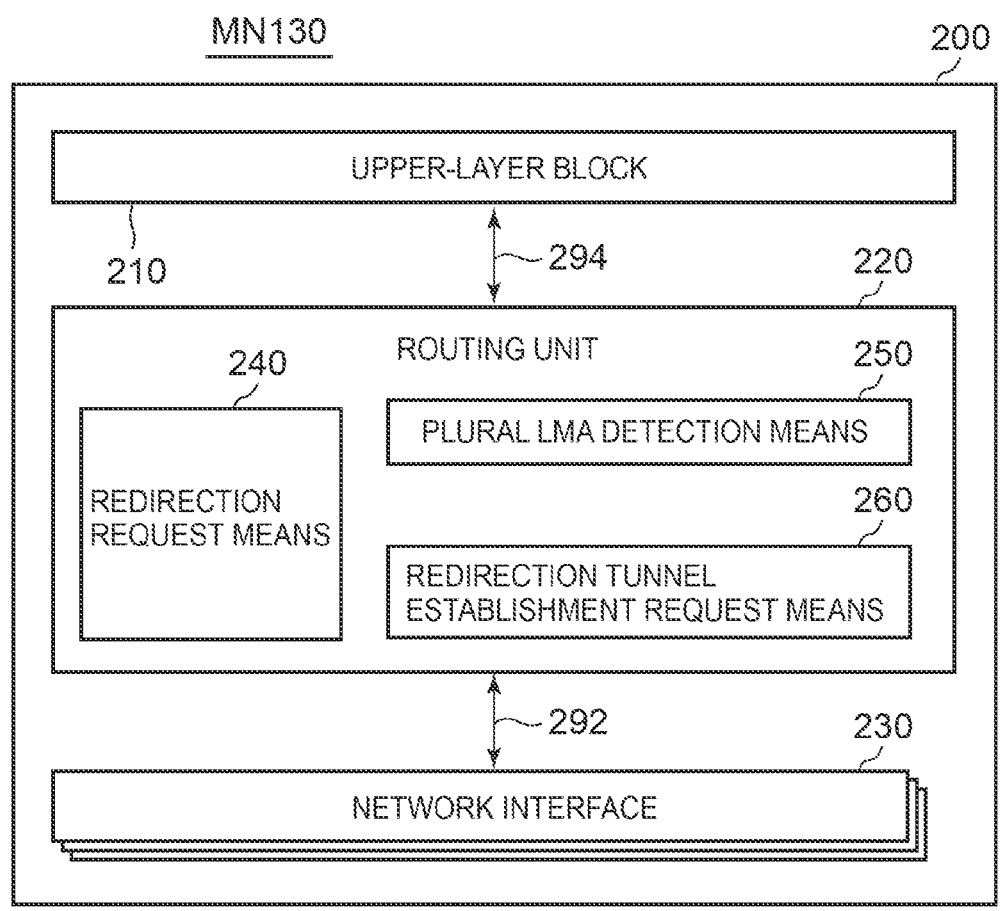
FIG. 9 is a block diagram showing a functional architecture of a mobile node of FIG. 1.

In Embodiment 8, the MN 130 informs the LMA 112 as the redirect destination via the LMA 111 as the redirection source about whether the MAG 122 as the redirection destination is a legacy or not. Then, during packet transferring by the LMA 112 as the redirection destination to the MAG 122 as the redirect destination, selection of encapsulation is easily performed. That is, when the MAG 122 is a MAG 122a not a legacy as shown in FIG. 3, encapsulation is not performed. On the other hand, when the MAG as the redirect destination is the MAG 122b not a legacy as shown in FIG. 4, encapsulation (436b) is performed. In this case, when the MAG as the redirect destination is a MAG 122a not a legacy, as shown in FIG. 8(1), the request message 810 for the redirection from the MN 130 is accepted by the MAG 122a. When the MAG as the redirect destination is the MAG 122b not a legacy, as shown in FIG. 8(6)(7)(8), the request message 850 for redirection from the MN 130 is refused by the MAG 124, and so, on the basis of the response, the MN 130 can inform about whether the MAG 122a as the redirect destination is a legacy or not with the encapsulation request message 854.
<MN>
FIG. 9 shows a functional architecture 200 of the MN 130. The architecture 200 includes one or a plurality of network interfaces 230 to transmit/receive a packet (131, 132 of FIG. 1), a routing unit 220 deciding to transfer a packet to a related program in the MN 130 or an appropriate network interface 230 and an upper-layer block 210 executing a protocol and a program at an upper layer of the network layer. Each network interface 230 is a functional block having hardware and software required for a communication of the MN 130 with other nodes via a certain communication medium. In terms known in the related technical fields, the network interface 230 represents a communication component of layer 1 (physical layer) and layer 2 (data link layer), firmware, a driver and a communication protocol. It would be obvious for those skilled in the art that the MN 130 may include one or a plurality of network interfaces 230.

The routing unit 220 handles all decision processing as to how a packet is routed to an appropriate program in the upper-layer block 210 for processing and how a packet is routed to the network interface 230 for transmission. In terms known in the related technical fields, the routing unit 220 represents a protocol for layer-3 (network layer) such as IPv4 (Internet Protocol version 4) and IPv6. A signal/data path 292 enables the routing unit 220 to receive/transmit a packet from/to an appropriate network interface 230. Similarly, a signal/data path 294 enables the routing unit 220 to receive/transmit a packet from/to an appropriate program in the upper-layer block 210.

The upper-layer block 210 is a functional block having all protocols and programs at upper layers of the network layer in the communication stack. These protocols and programs include protocols for a transport layer and a session layer such as TCP (Transmission Control Protocol), SCTP (Stream Control Transport Protocol) and UDP (User Datagram Protocol) and programs and software required for a communication with other nodes. The upper-layer block 210 can transfer a packet with the routing unit 220 via the signal/data path 294.

The routing unit 220 includes, in addition to standard functional elements (not illustrated in FIG. 9) required to execute a layer-3 function, redirection request means 240, plural LMA detection means 250 and redirection tunnel establishment request means 260. These means 240, 250 and 260 are core parts of the present invention. The plural LMA detection means 250 detects the case where the MN 130 accesses the global communication network 100 via the plurality of LMAs 111 and 112 in the local domain 110. The redirection tunnel establishment request means 260 decides to make a request for establishment of redirection tunnel T or T1 in the local domain 110 and transmits the request via one of the network interfaces 230. The redirection request means 240 sets up a rule (redirection descriptor) to transfer a reception packet to an alternative network interface 230 via the redirection tunnel T, T1 and transmit a transmission packet via an alternative network interface 230 and the redirection tunnel T, T1.

Figure 10:
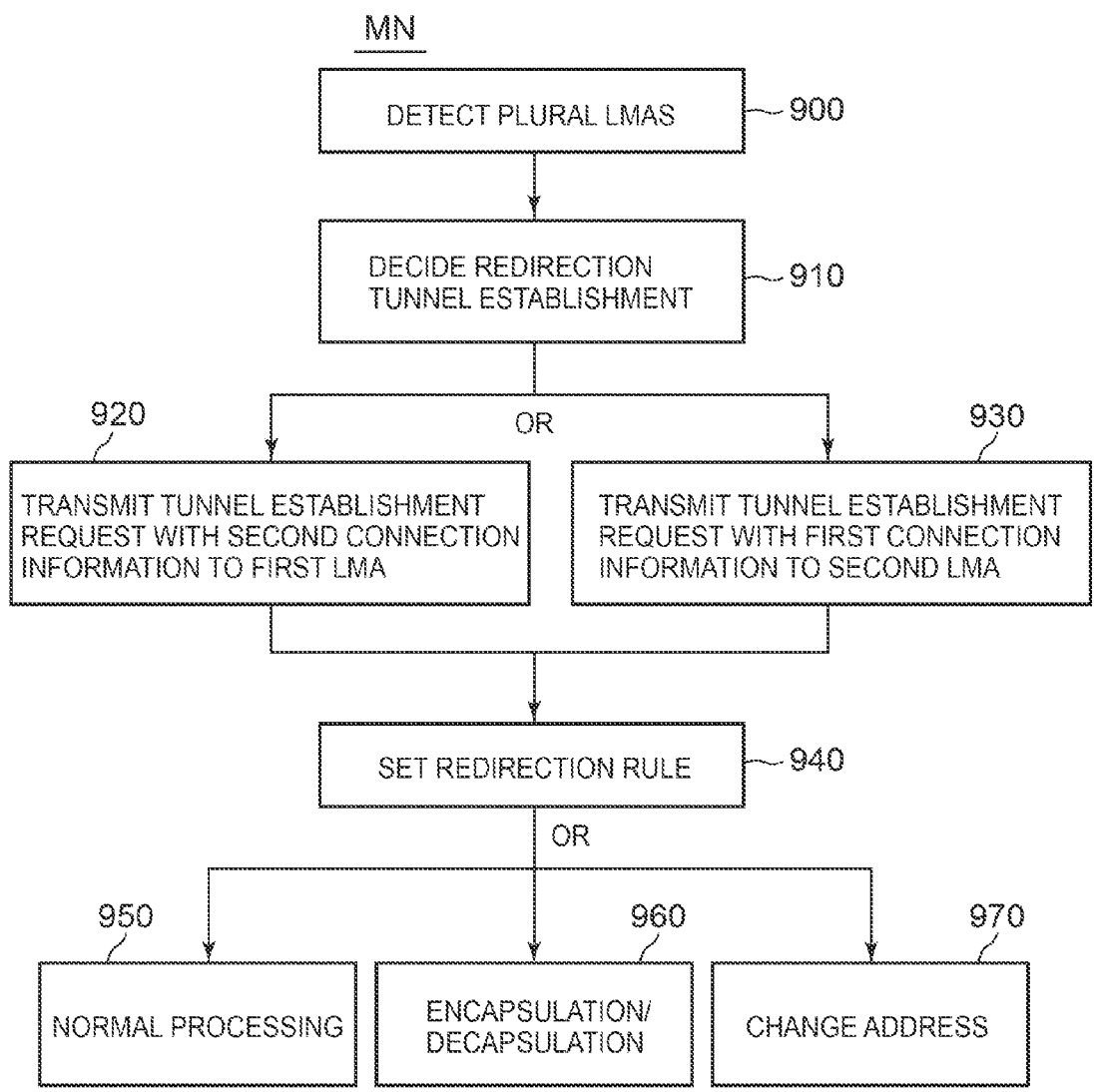
FIG. 10 is a flowchart to describe the operation of a mobile node in FIG. 1.

Referring now to FIG. 10, the operation of the MN 130 is described below. When the MN 130 decides to redirect a flow from the first connection to the second connection, or predicts the necessity of redirection, the MN 130 executes detection processing of a plurality of LMAs (Step 900). This detection processing includes processing to detect whether a plurality of LMAs exist or not along the first and the second connections. As described above, examples of this detection processing may include, but are not limited to, processing to compare an APN related to each connection with each address of a plurality of LMAs, processing to make an inquiry about LMA information for each MAG connecting to the MN 130 and processing to make an inquiry about a LMA address in a DNS using FQDN created from each APN.

When detecting a plurality of LMAs, the MN 130 shifts to processing to establish a redirection tunnel T, T1 for redirection of a flow of the first connection to the second connection (Step 910). There are many methods available as the method for allowing the MN 130 to establish the redirection tunnel T, T1. One of these methods is to transmit a redirection tunnel establishment request message from the MN 130 to the LMA 111 of the first connection and to describe information on the second connection in the request message (Step 920). Examples of the information on the second connection may include, but are not limited to, an APN related to the second connection, the address of the LMA 112 of the second connection, the address of the MAG 122 of the second connection and the interface identifier and the connection ID Of the second connection.

Alternatively, the MN 130 may transmit a redirection tunnel establishment request message to the LMA 112 of the second connection and may describe information on the first connection in the request message (Step 930). Examples of the information on the first connection may include, but are not limited to, an APN related to the first connection, the address of the LMA 111 of the first connection, the address of the MAG 121 of the first connection and the interface identifier and the connection ID Of the first connection.

Whether or not to transmit the redirection tunnel establishment request message to the first LMA 111 or the second LMA 112 (or the second MAG 122a) may be decided depending on the followings, but are not limited to, such as the operator policy of the local domain 110, comparison of security related between the first and the second connections and available band of the first and the second connections. For instance, in 3GPP, an operator may permit a redirection tunnel establishment request message when the redirection tunnel establishment request message passes through a 3GPP cellular link only.

When the redirection tunnel T is established, the MN 130 sets a redirection rule via the redirection tunnel T (Step 940). The redirection rule setting processing includes some steps (Steps 950, 960, 970) for making the MN 130 transmit or receive a packet. For instance, as shown in FIG. 3, when the MAG 122a of the second connection knows the prefix P1 assigned to the first connection, the MN 130 executes a normal operation (Step 950). Alternatively, the LMA 111 may decide to encapsulate a packet of the first connection in a packet with an address having the valid prefix P2 of the second connection. Such encapsulation is performed when the MAG 122b does not know the prefix P1 of the first connection and executes Ingress filtering as shown in FIG. 4. In this case, the MN 130 has to decapsulate a reception packet and encapsulate a transmission packet (Step 960). Alternatively, in order to cope with Ingress filtering of the MAG 122b as shown in FIG. 6, the LMA 111 may decide to change an address of a packet passing through the redirection tunnel T. In this case, the MN 130 has to restore the destination address of a reception packet and change the transmission source address of a transmission packet (Step 970).

A necessary step depends on the procedure of the MN 130. In one of preferable methods, the LMA 111 instructs the MN 130 about a necessary step with a response message in response to the redirection tunnel establishment request message. Alternatively, the MN 130 may instruct about its own request in the redirection tunnel establishment request message. In another preferable method, the MN 130 detects a necessary step when receiving a reception packet. Encapsulated reception packet means that the MN 130 has to shift to Step 960, the reception packet has to be decapsulated and the transmission packet has to be encapsulated. The reception packet with a changed destination address means that the MN 130 has to shift to Step 970, and the destination address of the reception packet has to be restored and the transmission source address of the transmission packet has to be changed. Otherwise, the MN 130 executes a normal operation, i.e., Step 950.

<LMA>

Figure 11:
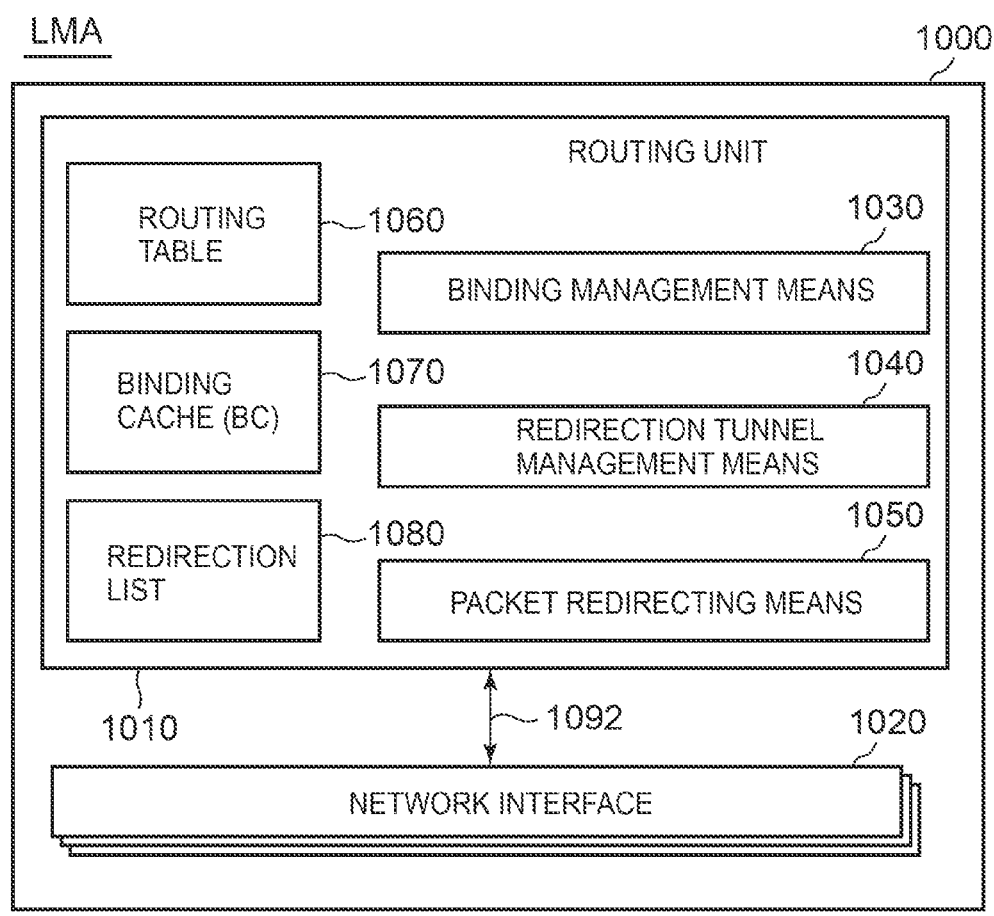
FIG. 11 is a block diagram showing a functional architecture of a LMA in FIG. 1.

FIG. 11 shows a functional architecture 1000 of the LMAs 111 and 112. The architecture 1000 includes one or a plurality of network interfaces 1020 to transmit/receive a packet and a routing unit 1010 to decide to transfer a packet to an appropriate network interface 1020. Each network interface 1020 is a functional block having hardware and software required for a communication with other nodes via a communication medium where the LMAs 111 and 112 exist and for transmission/reception of a packet to/from the MN 130 assigned to the LMAs 111 and 112. In terms known in the related technical fields, the network interface 1020 represents a communication component of layer 1 (physical layer) and layer 2 (data link layer), firmware, a driver, and a communication protocol. It would be obvious for those skilled in the art that the functional architecture 1000 may include one or a plurality of network interfaces 1020.

The routing unit 1010 handles all decision processing as to how a packet is routed to an appropriate network interface 1020. In terms known in the related technical fields, the routing unit 1010 represents a protocol for layer-3 (network layer) such as IPv4 and IPv6 and a router function required for the LMAs 111 and 112. A signal/data path 1092 enables the routing unit 1010 to receive/transmit a packet from/to an appropriate network interface 1020.

The routing unit 1010 includes binding management means 1030, redirection tunnel management means 1040, packet redirecting means 1050, a routing table 1060, a binding cache (BC) 1070 and a redirection list 1080 in addition to standard functional other elements (not illustrated in FIG. 11) required to implement LMA functions. The binding management means 1030 manages to bind home network prefixes P1 and P2 of the MN 130 with addresses of the MAGs 112 and 122, respectively. Actual binding is stored in the BC 1070. When the binding management means 1030 accepts the binding of the MN 130, an appropriate entry is added to the BC 1070 or the BC 1070 is updated. At the routing table 1060 as well, a routing entry to transfer a packet to the MN 130 or transfer a packet from the MN 130 is created, or the routing table 1060 is updated.

The packet redirecting means 1050 has a function to set up a redirecting rule (redirecting descriptor) required from the MN 130 or a foreign policy server. An actual redirecting rule is installed in the redirection list 1080. When the routing unit 1010 decides routing of a packet, the redirection list 1080 checks whether there is a redirecting rule matching or not. Such a packet is routed on the basis of the routing table 1060, when there is a redirecting rule matching, on the basis of the destination address designated by the rule, or when there is no redirecting rule matching, on the basis of the packet.

The redirection tunnel management means 1040 manages the redirection tunnel establishment request message 312, 412, 512, 720 or 812 from the MN 130, and establishes a redirection tunnel T, T1 with the LMA 112, 111 or the MAG 122 on the basis of the request. The redirection tunnel management means 1040 of the LMA 112 further changes an address field of a packet via the redirection tunnel T as in the address change processing 634, 656 shown in FIG. 6.

Figure 12:
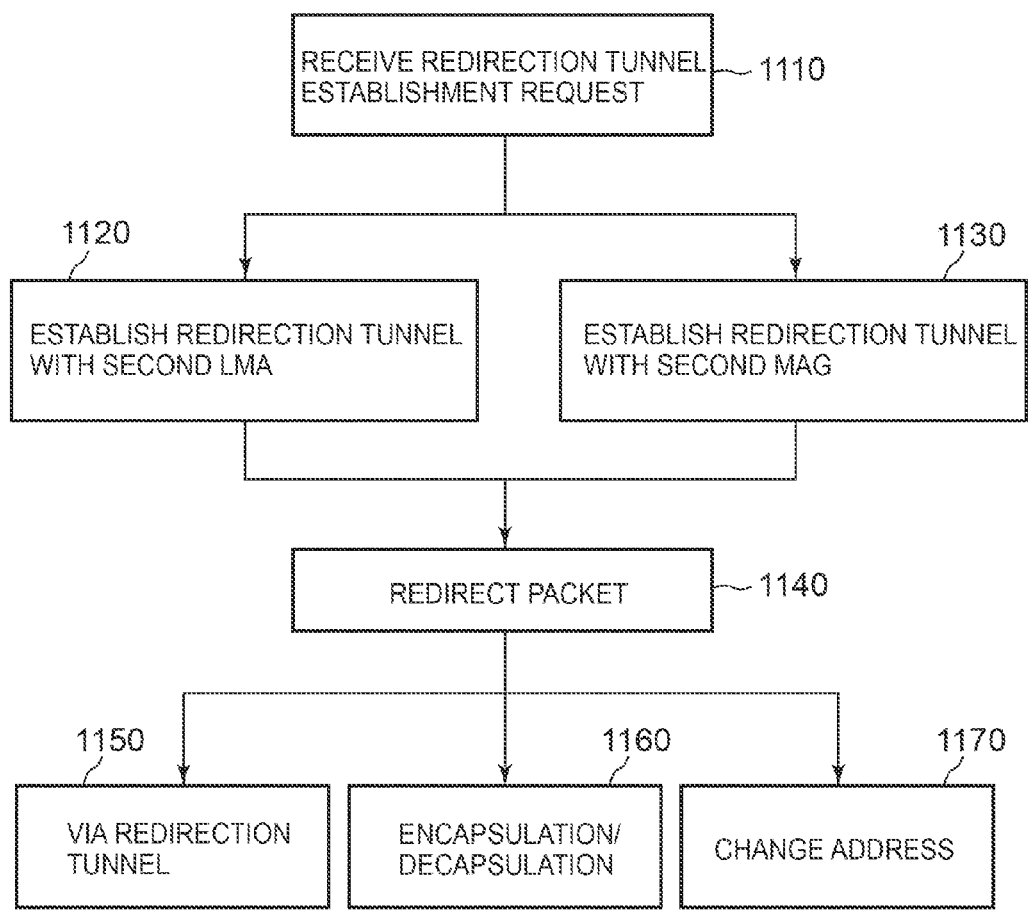
FIG. 12 is a flowchart to describe the operation of a LMA in FIG. 1.

Referring now to FIG. 12, the operation of the LMA 111 is described below. Receiving a redirection tunnel establishment request message from the MN 130 at Step 1110, the LMA 111 establishes the redirection tunnel T, T1 with an entity of the second connection on the basis of information described in such a request message at Step 1120 or 1130. For instance, at Step 1120, the LMA 111 establishes the redirection tunnel T with the LMA 112 of the second connection, and at Step 1130, the LMA 111 establishes the redirection tunnel T1 with the MAG 122 of the second connection. Such a selection depends on the following criteria, but are not limited to, including whether the MAG 122 knows the prefix P1 assigned to the first connection or not, a decision of the LMA 112 of the second connection, a decision of another entity (e.g., a home subscriber in the 3GPP network or a policy control resource function) in the local domain 110, a type of the access network 102 of the second connection (when the type of the access network 102 of the second connection is in a narrow range, the LMA of the second connection is preferable because the MAG of the second connection is frequently changed) and the mobility pattern of the MN 130.

When the redirection tunnel T, T1 is established, the LMA 111, 112 redirects a reception packet to the MN 130 and a transmission packet of the MN 130 (Step 1140). During this direction, any one of Steps 1150, 1160 and 1170 is executed on the basis of the ability of the other end of the redirection tunnel T, T1 and the configuration of the redirection tunnel T, T1.

For instance, when the MAG 122a of the second connection knows the prefix P1 assigned to the first connection as shown in FIG. 3, the LMA 111 simply transfers a packet via the redirection tunnel T (Step 1150). Alternatively, as shown in FIG. 4, the LMA 112 can decide to encapsulate a reception packet from the redirection tunnel T and decapsulate a transmission packet prior to transferring to the redirection tunnel T (Step 1160). This encapsulation/decapsulation is performed when the MAG 122b of the second connection does not know the prefix P1 assigned to the first connection and may execute Ingress filtering. Alternatively, in order to cope with Ingress filtering at the MAG 122 of the second connection as shown in FIG. 6, the LMA 112 may decide to change an address of a packet passing through the direction tunnel T (Step 1170). In this case, the LMA 112 has to restore the transmission source address of a reception packet exiting from the direction tunnel T and change the transmission source address of a transmission packet entering the direction tunnel T.

<MAG>

Figure 13:
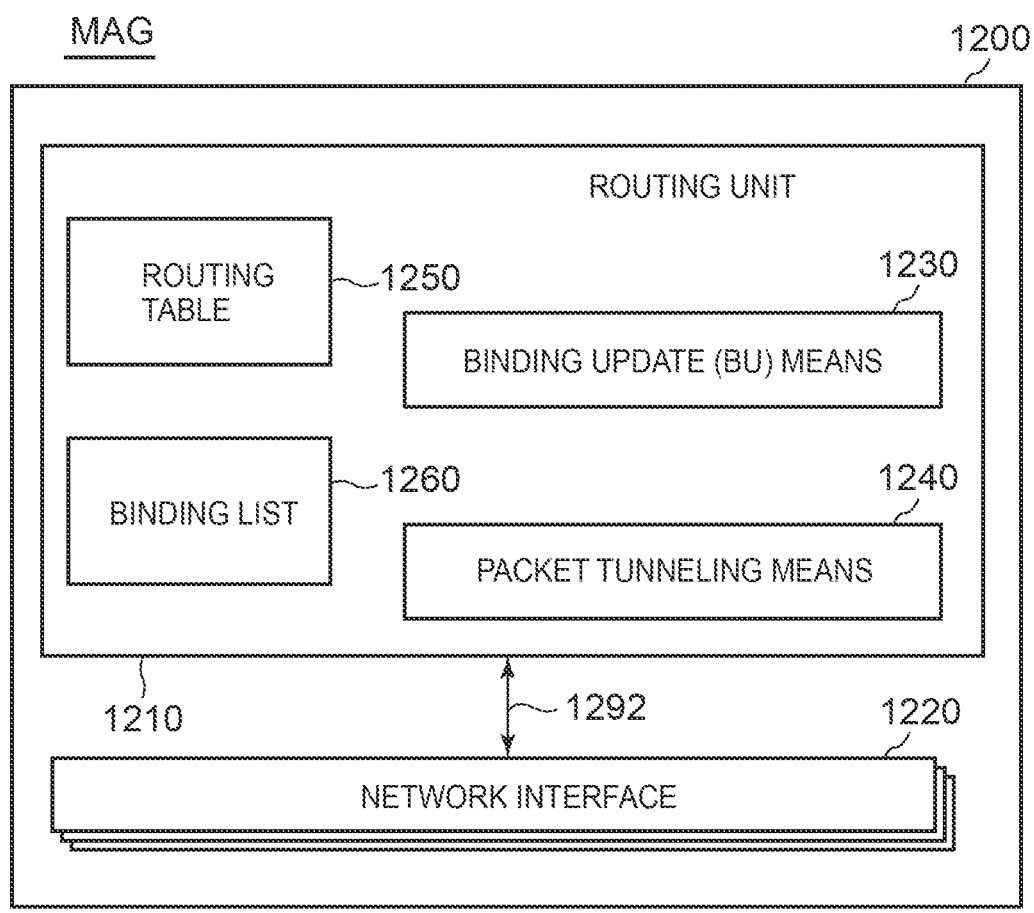
FIG. 13 is a block diagram showing a functional architecture of a MAG in FIG. 1.

FIG. 13 shows a functional architecture 1200 of the MAGs 121, 122 and 124. The architecture 1200 includes one or a plurality of network interfaces 1220 to transmit/receive a packet and a routing unit 1210 to decide to transfer a packet to an appropriate network interface 1220. Each network interface 1220 is a functional block having hardware and software required for a communication with other nodes via a communication medium where the MAGs 121, 122 and 124 exist and for transmission/reception of a packet to/from the MN 130 attaching to the MAGs 121, 122 and 124. In terms known in the related technical fields, the network interface 1220 represents a communication component of layer 1 (physical layer) and layer 2 (data link layer), firmware, a driver, and a communication protocol. It would be obvious for those skilled in the art that the functional architecture 1200 may include one or a plurality of network interfaces 1220.

The routing unit 1210 handles all decision processing as to how a packet is routed to an appropriate network interface

1220. In terms known in the related technical fields, the routing unit 1210 represents a protocol for layer-3 (network layer) such as IPv4 and IPv6 and a router function required for the MAGs 121, 122 and 124. A signal/data path 1292 enables the routing unit 1210 to receive/transmit a packet from/to an appropriate network interface 1220.

The routing unit 1210 includes binding update (BU) means 1230, packet tunneling means 1240, a routing table 1250 and a binding list 1260 in addition to standard functional other elements (not illustrated in FIG. 13) required to implement MAG functions. The BU means 1230 attaches to the MAGs 121, 122 and 124 and transmits a proxy BU message for the MN 130 to an appropriate LMA 111, 112. Actual binding is stored in the binding list 1260. When the LMA 111, 112 accepts the binding of the MN 130, an appropriate entry is added to the binding list 1260 or the binding list 1260 is updated. An entry at the routing table 1250 as well is created to set up a routing entry for transferring of a packet between the MN 130 and the LMA 111, 112, or the routing table 1250 is updated. If needed, the BU means 1230 further transfers a redirection tunnel establishment request message from the MN 130 to the LMA 111, 112.

The packet tunneling means 1240 has a function to set up a tunnel between the MN 130 and the LMA 111, 112 to transfer a packet. This function includes encapsulation of a packet that the MN 130 transmits and decapsulation of a packet transferred to the MN 130. The packet tunneling means 1240 further permits the establishment of the redirection tunnel T1 with the LMA 111 requested by the MN 130 as disclosed in Embodiments 6 and 7.

Figure 14:
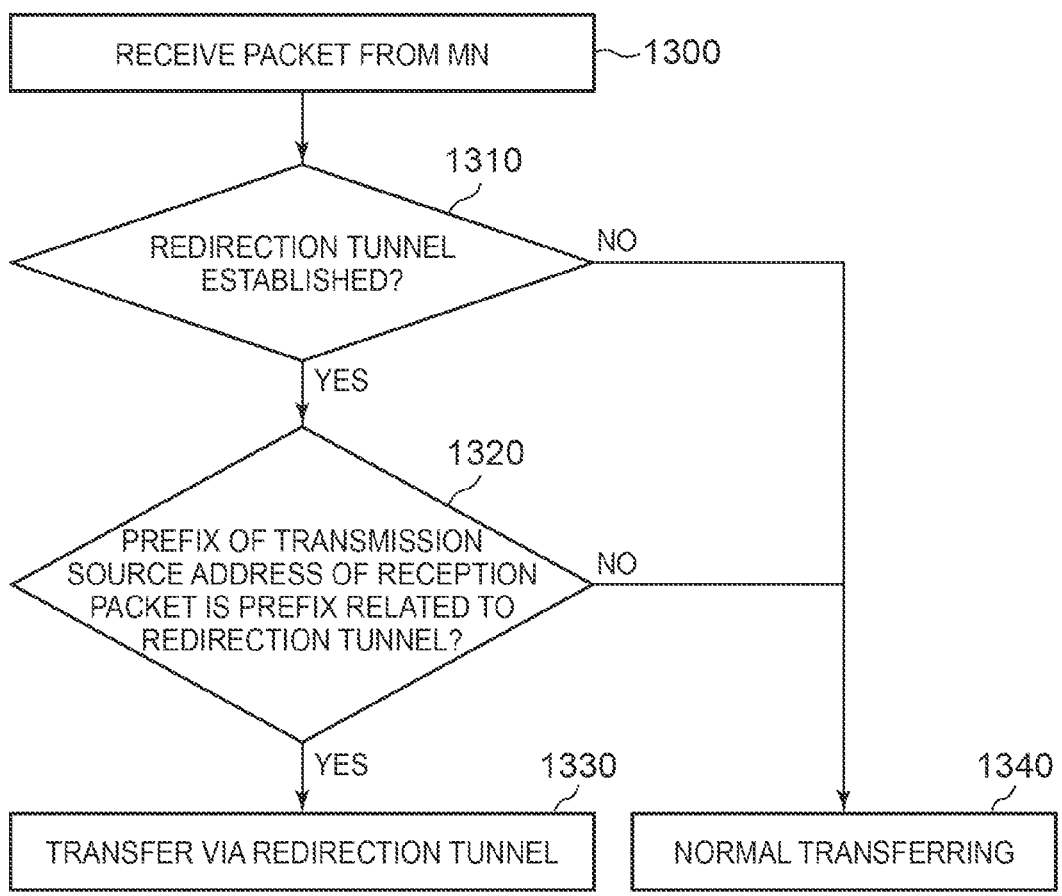
FIG. 14 is a flowchart to describe the operation of a MAG in FIG. 1.

FIG. 14 shows an operation of a MAG when the MAG receives a packet from the MN 130. This operation is required for the establishment of the redirection tunnel T1 between the first LMA 111 and the second MAG 122 as shown in FIGS. 7 and 8. Receiving a packet from the MN 130 (Step 1300), the MAG 122 checks whether the redirection tunnel T1 for the MN 130 is established or not (Step 1310). If the redirection tunnel T1 is not established, the packet is normally transferred (Step 1340). On the other hand, if the redirection tunnel T1 is established, the MAG 122 checks a prefix of the address in the reception packet (Step 1320). At this time, the MAG 122 checks whether the prefix of the transmission source address in the reception packet equals or not the prefix related to the redirection tunnel T1. If they do not equal, the packet is normally transferred (Step 1340). On the other hand, if they equal, the packet is transferred via the redirection tunnel T1 (Step 1330).

<Application to 3GPP>

That is the description of embodiments of the present invention, and the following describes a practical scenario. The present invention is applicable to 3GPP, and in 3GPP, the local domain 110 is 3GPP EPC (Evolved Packet Core), the LMA 111, 112 is a PDN-GW (Packet Data network Gateway) and the MAG 121, 122, 124 is a S-GW (Serving Gateway) of 3GPP access, an AGW (Access Gateway) of non-3GPP access or an ePDG (evolved Packet Data Gateway).

In the application to 3GPP, the plural LMA detection means 250 of the MN 130 shown in FIG. 9 can detect the connection to a plurality of PDN-GWs by comparing APNs related to the connections of the MN 130. Alternatively, the MN 130 may make an inquiry to a DHCP (Dynamic Host Configuration Protocol) server to know the address of a PDN-GW of each access. Additionally, when the MN 130 uses a client-based mobility management protocol (e.g., MIP), a function letting the MN 130 learn the address of the home agent (provided in a PDN-GW) may be used. The plural LMA detection means 250 can use these addresses to detect a plurality of PDN-GWs.

The redirection tunnel establishment request message and the redirection request that the MN 130 transmits to a 3GPP EPC may be embedded in a bearer modification message used for transmission via 3GPP. In the case of a non-3GPP access to 3GPP EPC, the redirection tunnel establishment request message and the redirection request may be embedded in IKE signaling (IKE_SA_INIT, IKE_AUTH) exchanged with the ePDG or may be transmitted with a mobility header option of client-based and direct mobility signaling (e.g., a BU message) with a PDN-GW.

That is a description of the present invention, by way of the most practical and preferable embodiments. However, it would be obvious for those skilled in the art that the present invention can be modified variously without departing from the scope of the present invention. Further, each functional block used in the description of the above-stated embodiments may be typically implemented as a LSI that is an integrated circuit. These blocks may be individually configured as one chip, or one chip may include a part or all of the functional blocks. LSIs may be called an IC (Integrated Circuit), a system LSI, a super LSI, and an ultra LSI depending on the degree of integration. A technique for integrated circuit is not limited to a LSI, but an integrated circuit may be achieved using a dedicated circuit or a general-purpose processor. A FPGA (Field Programmable Gate Array) capable of programming after manufacturing a LSI and a reconfigurable processor capable of reconfiguring connection and setting of a circuit cell inside a LSI may be used. Further, if a technique for integrated circuit that replaces LSIs becomes available by the development of a semiconductor technique or derived techniques, functional blocks may be naturally integrated using such a technique. For instance, biotechnology may be applied thereto.

INDUSTRIAL APPLICABILITY

The present invention has the effect of eliminating wasted tunneling encapsulation and decapsulation processing by a home agent and a mobile node during redirection of a packet when a proxy node as a redirect destination knows the prefix of a redirect source. The present invention can be used in 3GPP, for example.

The invention claimed is:

1. A redirection system for redirecting a packet from a first connection of a mobile node to a second connection of the mobile node, the first connection passing through a first home agent and a first proxy node using a first prefix assigned to a first interface of the mobile node, the second connection passing through a second home agent and a second proxy node using a second prefix assigned to a second interface of the mobile node, comprising:

means that establishes a tunnel for redirection between the first home agent and the second home agent and makes the first home agent encapsulate the packet addressed to the first prefix to be addressed to the second home agent on a basis of a redirection request and redirect the packet via the tunnel for redirection;

means that, when the second proxy node knows the first prefix, makes the second home agent encapsulate the packet addressed to the first prefix that is redirected via the tunnel for redirection to be addressed to the second proxy node for transferring, and means that, when the second proxy node does not know the first prefix, makes the second home agent encapsulate the packet addressed to the first prefix that is redirected via the tunnel for redirection to be addressed to an address generated from the second prefix assigned to the second connection and further encapsulate the packet to be addressed to the second proxy node for transferring.

2. The redirection system according to claim 1, further comprising means that, when the second proxy node does not know the first prefix, makes the second home agent change a destination address of the packet addressed to the first prefix that is redirected via the tunnel for redirection to the second prefix and encapsulate the packet to be addressed to the second proxy node for transferring.

3. A mobile node in a redirection system for redirecting a packet of a first connection of the mobile node to a second connection of the mobile node, the first connection passing through a first home agent and a first proxy node using a first prefix assigned to a first interface of the mobile node, the second connection passing through a second home agent and a second proxy node using a second prefix assigned to a second interface of the mobile node, comprising:
- means that detects whether the first and the second connections are connected simultaneously;
- tunnel establishment request means that, when it is detected that the first and the second connections are connected simultaneously, requests the first or the second home agent to establish a tunnel for redirection between the first home agent and the second home agent; and
- redirection request means that requests the first home agent to redirect a packet addressed to the first prefix via the tunnel for redirection,
- wherein, when the second proxy node knows the first prefix, the second home agent encapsulates the packet addressed to the first prefix that is redirected via the tunnel for redirection to be addressed to the second proxy node for transferring, and
- wherein, when the second proxy node does not know the first prefix, the second home agent encapsulates the packet addressed to the first prefix that is redirected via the tunnel for redirection to be addressed to an address generated from the second prefix assigned to the second connection and further encapsulates the packet to be addressed to the second proxy node for transferring.

4. A home agent that is a first home agent in a redirection system for redirecting a packet from a first connection of a mobile node to a second connection of the mobile node, the first connection passing through the first home agent and a first proxy node using a first prefix assigned to a first interface of the mobile node, the second connection passing through a second home agent and a second proxy node using a second prefix assigned to a second interface of the mobile node, comprising:
- means that establishes a tunnel for redirection between the first home agent and the second home agent; and
- means that encapsulates a packet addressed to the first prefix to be addressed to the second home agent and redirects the packet via the tunnel for redirection,
- wherein, when the second proxy node knows the first prefix, the second home agent encapsulates the packet addressed to the first prefix that is redirected via the tunnel for redirection to be addressed to the second proxy node for transferring, and
- wherein, when the second proxy node does not know the first prefix, the second home agent encapsulates the packet addressed to the first prefix that is redirected via the tunnel for redirection to be addressed to an address generated from the second prefix assigned to the second connection and further encapsulates the packet to be addressed to the second proxy node for transferring.

5. A home agent that is a second home agent in a redirection system for redirecting a packet from a first connection of a mobile node to a second connection of the mobile node, the first connection passing through a first home agent and a first proxy node using a first prefix assigned to a first interface of the mobile node, the second connection passing through the second home agent and a second proxy node using a second prefix assigned to a second interface of the mobile node, comprising:
- means that establishes a tunnel for redirection between the first home agent and the second home agent;
- means that, when the first home agent encapsulates a packet addressed to the first prefix to be addressed to the second home agent and redirects the packet via the tunnel for redirection and when the second proxy node knows the first prefix, encapsulates the packet addressed to the first prefix that is redirected via the tunnel for redirection to be addressed to the second proxy node for transferring; and
- means that, when the first home agent encapsulates a packet addressed to the first prefix to be addressed to the second home agent and redirects the packet via the tunnel for redirection and when the second proxy node does not know the first prefix, encapsulates the packet addressed to the first prefix that is redirected via the tunnel for redirection to be addressed to an address created from the second prefix assigned to the second connection and further encapsulates the packet to be addressed to the second proxy node for transferring.

6. The home agent according to claim 5, further comprising means that, when the first home agent encapsulates a packet addressed to the first prefix to be addressed to the second home agent and redirects the packet via the tunnel for redirection and when the second proxy node does not know the first prefix, changes a destination address of the packet addressed to the first prefix that is redirected via the tunnel for redirection to the second prefix and encapsulates the packet to be addressed to the second proxy node for transferring.

* * * * *